United States Patent
Cordell et al.

(10) Patent No.: US 10,540,557 B2
(45) Date of Patent: Jan. 21, 2020

(54) METHOD AND APPARATUS FOR PROVIDING DRIVER INFORMATION VIA AUDIO AND VIDEO METADATA EXTRACTION

(71) Applicant: Xevo Inc., Bellevue, WA (US)

(72) Inventors: John Palmer Cordell, Los Angeles, CA (US); Robert Victor Welland, Seattle, WA (US); Samuel James McKelvie, S. Seattle, WA (US); John Hayes Ludwig, Bellevue, WA (US)

(73) Assignee: Xevo Inc., Bellevue, WA (US)

( * ) Notice: Subject to any disclaimer, the term of this patent is extended or adjusted under 35 U.S.C. 154(b) by 171 days.

(21) Appl. No.: 15/672,832

(22) Filed: Aug. 9, 2017

(65) Prior Publication Data

US 2018/0046870 A1 Feb. 15, 2018

Related U.S. Application Data

(60) Provisional application No. 62/372,999, filed on Aug. 10, 2016.

(51) Int. Cl.
*G06K 9/00* (2006.01)
*H04W 4/02* (2018.01)
(Continued)

(52) U.S. Cl.
CPC ......... *G06K 9/00845* (2013.01); *B60Q 9/008* (2013.01); *B60R 1/00* (2013.01);
(Continued)

(58) Field of Classification Search
CPC .. G06K 9/00845; G06K 9/00; G06K 9/00798; G06K 9/00812; G06K 9/00832;
(Continued)

(56) References Cited

U.S. PATENT DOCUMENTS 7,119,832 B2 10/2006 Blanco et al.
8,593,301 B2 11/2013 Newman
(Continued)

FOREIGN PATENT DOCUMENTS

JP 2009146086 A 7/2009
JP 2016057959 A 4/2016
(Continued)

OTHER PUBLICATIONS

International Search Report for PCT/US2017/068245, Filing date Dec. 22, 2017, Korean Intellectual Property Office, Republic of Korea.
(Continued)

*Primary Examiner* — Andrew M Moyer

(57) ABSTRACT

A method and/or system is able to provide driver fingerprint via metadata extraction managed by a driver rating ("DR") model trained by a machine learning center ("MLC") coupled to a cloud based network ("CBN"). In one embodiment, a DR system includes a set of outward facing cameras, a set of inward facing cameras, and a vehicle onboard computer ("VOC"). The set of outward facing cameras mounted on a vehicle is used to collect external images representing a surrounding environment in which the vehicle operates. The set of inward facing cameras mounted in the vehicle is used to collect internal images including operator body expression representing at least operator's attention. The VOC is configured to determine the identity of operator and current operating style in response to the collected internal images, the collected external images, and historical stored data.

15 Claims, 19 Drawing Sheets

(51) Int. Cl.
| | |
|---|---|
| G08G 1/0968 | (2006.01) |
| G08G 1/0969 | (2006.01) |
| H04L 29/08 | (2006.01) |
| H04W 4/44 | (2018.01) |
| G01C 21/36 | (2006.01) |
| G08G 1/01 | (2006.01) |
| B60Q 9/00 | (2006.01) |
| G06K 9/66 | (2006.01) |
| G08G 1/16 | (2006.01) |
| G08G 1/04 | (2006.01) |
| B60R 1/00 | (2006.01) |
| B60R 1/04 | (2006.01) |
| B60R 1/062 | (2006.01) |
| G01S 19/48 | (2010.01) |
| G08G 1/14 | (2006.01) |
| H04N 7/18 | (2006.01) |
| G06N 20/00 | (2019.01) |
| G06N 3/08 | (2006.01) |
| G06N 3/04 | (2006.01) |
| G05D 1/02 | (2006.01) |

(52) U.S. Cl.
CPC ............... *B60R 1/04* (2013.01); *B60R 1/062* (2013.01); *G01C 21/3602* (2013.01); *G01C 21/3605* (2013.01); *G01S 19/48* (2013.01); *G06K 9/00281* (2013.01); *G06K 9/00604* (2013.01); *G06K 9/00791* (2013.01); *G06K 9/00798* (2013.01); *G06K 9/00805* (2013.01); *G06K 9/00812* (2013.01); *G06K 9/00832* (2013.01); *G06K 9/00979* (2013.01); *G06K 9/66* (2013.01); *G08G 1/0112* (2013.01); *G08G 1/0116* (2013.01); *G08G 1/0129* (2013.01); *G08G 1/04* (2013.01); *G08G 1/0969* (2013.01); *G08G 1/096811* (2013.01); *G08G 1/096861* (2013.01); *G08G 1/096888* (2013.01); *G08G 1/143* (2013.01); *G08G 1/166* (2013.01); *H04L 67/10* (2013.01); *H04N 7/188* (2013.01); *H04W 4/02* (2013.01); *H04W 4/44* (2018.02); *B60R 2300/105* (2013.01); *B60R 2300/8006* (2013.01); *G05D 1/0214* (2013.01); *G05D 1/0246* (2013.01); *G06K 2209/27* (2013.01); *G06N 3/0454* (2013.01); *G06N 3/08* (2013.01); *G06N 20/00* (2019.01)

(58) Field of Classification Search
CPC ........... G06K 9/00791; G06K 9/00604; G06K 9/00281; G06K 9/00979; G06K 9/00805; G06K 9/66; G06K 2209/27; H04W 4/44; H04W 4/02; H04L 67/10; G08G 1/166; G08G 1/0969; G08G 1/096861; G08G 1/096811; G08G 1/0116; G08G 1/096888; G08G 1/143; G08G 1/04; G08G 1/0129; G08G 1/0112; G01C 21/3602; G01C 21/3605; H04N 7/188; G01S 19/48; B60Q 9/008; B60R 1/00; B60R 1/04; B60R 1/062; B60R 2300/105; B60R 2300/8006; G06N 20/00; G05D 1/0214; G05D 1/0246
USPC ........................................................ 382/104
See application file for complete search history.

(56) References Cited

U.S. PATENT DOCUMENTS

| | | | |
|---|---|---|---|
| 8,903,593 B1 | 12/2014 | Addepalli et al. | |
| 9,373,203 B1 | 6/2016 | Fields et al. | |
| 9,428,052 B1* | 8/2016 | Raz | B60W 40/08 |
| 2008/0186210 A1 | 8/2008 | Tseng | |
| 2010/0185390 A1 | 7/2010 | Monde et al. | |
| 2011/0313593 A1 | 12/2011 | Cohen et al. | |
| 2015/0073664 A1 | 3/2015 | Petridis et al. | |
| 2015/0092056 A1* | 4/2015 | Rau | G08G 1/167 348/148 |
| 2015/0213555 A1 | 7/2015 | Barfield, Jr. et al. | |
| 2016/0065903 A1 | 3/2016 | Wang et al. | |
| 2017/0200061 A1* | 7/2017 | Julian | G08G 1/04 |

FOREIGN PATENT DOCUMENTS

| | | |
|---|---|---|
| KR | 10-2014-0002373 A | 1/2014 |
| KR | 1020150137264 A | 12/2015 |
| KR | 10-2016-0139624 A | 12/2016 |
| WO | 2013005912 A1 | 1/2013 |

OTHER PUBLICATIONS

U.S. Appl. No. 15/852,346, filed Dec. 22, 2017, Method and System for Providing Artificial Intelligence Analytic (AIA) Services Using Operator Fingerprints and Cloud Data, First Named Inventor: Richard Chia Tsing Tong.

* cited by examiner

METHOD AND APPARATUS FOR PROVIDING DRIVER INFORMATION VIA AUDIO AND VIDEO METADATA EXTRACTION

PRIORITY

This application claims the benefit of priority based upon U.S. Provisional Patent Application having an application Ser. No. 62/372,999, filed on Aug. 10, 2016, and having a title of "Method and System for Providing Information Using Collected and Stored Metadata," which is hereby incorporated by reference in its entirety.

RELATED APPLICATION

This application is related to the following co-pending application assigned to the Assignee of the present invention.

a. Application Ser. No. 15/672,747, filed Aug. 9, 2017, entitled "Method and Apparatus for Providing Information via Collected and Stored Metadata Using Inferred Attentional Model," invented by the same inventors;

b. Application Ser. No. 15/672,897 filed Aug. 9, 2017, entitled "Method and Apparatus for Providing Automatic Mirror Setting via Inward Facing Cameras," invented by the same inventors; and c. Application Ser. No. 15/673,909, filed Aug. 9, 2017, entitled "Method and Apparatus for Providing Goal Oriented Navigational Directions," invented by the same inventors.

FIELD

The exemplary embodiment(s) of the present invention relates to the field of communication networks. More specifically, the exemplary embodiment(s) of the present invention relates to operating an intelligent machine using a virtuous cycle between cloud, machine learning, and containerized sensors.

BACKGROUND

With increasing popularity of automation and intelligent electronic devices, such as computerized machines, IoT (the Internet of Things), smart vehicles, smart phones, drones, mobile devices, airplanes, artificial intelligence ("AI"), the demand of intelligent machines and faster real-time response are increasing. To properly provide machine learning, a significant number of pieces, such as data management, model training, and data collection, needs to be improved.

A conventional type of machine learning is, in itself, an exploratory process which may involve trying different kinds of models, such as convolutional, RNN (recurrent neural network), et cetera. Machine learning or training typically concerns a wide variety of hyper-parameters that change the shape of the model and training characteristics. Model training generally requires intensive computation. As such, real-time response via machine learning model can be challenging.

A drawback associated with traditional automobile or vehicle is that a vehicle typically makes some decisions with limited knowledge of the context or environment in which it operates. Also, a vehicle has limited knowledge about user or operator driving skill or experience.

SUMMARY

One embodiment of the presently claimed invention discloses a method and/or driver rating system ("DRS") is able to provide driver fingerprint via metadata extraction managed by a DR model trained by a machine learning center ("MLC") coupled to a cloud based network ("CBN"). Driver fingerprint can also be referred to as operator's driving habit, driver pattern, driver behavior, driver experience, driver attitude, and the like. In one embodiment, DRS includes a set of outward facing cameras, a set of inward facing cameras, and a vehicle onboard computer ("VOC"). The set of outward facing cameras mounted on a vehicle is used to collect external images representing a surrounding environment in which the vehicle operates. For example, the outward facing cameras capture real-time images as the vehicle moves across a geographical area. In one aspect, the collecting external images include obtaining real-time images relating to at least one of road, buildings, traffic lights, pedestrian, and retailers.

The set of inward facing cameras mounted in the vehicle is used to collect internal images including operator body expression representing at least operator's attention. The inward facing cameras, for example, are configured to extract metadata associated with operator head pose, gaze direction, and looking at a mobile device. The collecting internal images include a set of interior sensors obtaining data relating to at least one of operator's eyes, facial expression, driver, and passage. For example, the obtaining data also include at least one camera is capable of detecting direction of where the operator is looking. The VOC is configured to determine the identity of operator and current operating style in response to the collected internal images, the collected external images, and historical stored data. In one example, the VOC is configured to communicate with a virtuous cycle to modify the DR model.

In one aspect, a virtuous cycle includes CBN, MLC, and sensors. The CBN is wirelessly coupled to the VOC and configured to correlate and generate labeled data associated with driver fingerprint based on historical DR cloud data, the collected internal images, and the collected external images. The MLC is coupled to the VOC and configured to train and improve the DR model based on the labeled data from the cloud based network. The DR model generates a rating model for the operator based on calculated feature vectors via the collected internal images, the collected external images, and historical stored data. The vectors, in one embodiment, indicates one of aggressive driving style, inattentive driving style, distracted driving style, and driving under influence.

DRS, in one embodiment, further includes a group of audio sensors coupled to the VOC and configured to provide metadata relating to audio data. The audio sensors include exterior audio sensors collecting exterior sound outside of the vehicle and interior audio sensors collecting interior sound inside of the vehicle.

In one aspect, DR model provides a process of providing driver rating via metadata extraction utilizing a virtuous cycle including sensors, machine learning center, and cloud based network. After activating a set of outward facing cameras mounted on a vehicle for recording external surrounding images representing a geographic environment in which the vehicle operates, the process is able to enable at least a portion of inward facing cameras mounted in the vehicle for collecting interior images of the vehicle. After calculating a driver style vector in accordance with external surrounding images, the internal images, and historical data, a driver rating associated to operator is generated via performance of a driver style analysis conducted by the DR model which is trained by the virtuous cycle. The DR model is also capable of tracking surrounding environmental event in accordance with the external surrounding images and historical data supplied by the virtuous cycle. Alternatively, the process is also able to generate a process of adaptive advice and assistance by an adaptive driver assistant ("ADA") model in response to external surrounding images, the internal images, and historical data. In one example, the driver rating can be provided to a subscriber requesting the driver fingerprint.

In another embodiment, an adaptive driver assistant ("ADA") system or system is capable of providing ADA utilizing a virtuous cycle containing sensors, MLC, and CBN. After monitoring operator body language of an operator captured by a set of interior sensors and capturing surrounding information observed by a set of exterior sensors onboard a vehicle as the vehicle is in motion, the process is able to selectively record data relating to the operator body language and the surrounding information in accordance with a containerized ADA model generated by MLC. Upon detecting an abnormal driving activity in accordance with the operator body language and surrounding information by the ADA model while the vehicle is in driving mode, a process of adaptive advice and assistance by ADA model is generated in response to the surrounding images, the operator body language, and historical data. In one aspect, after rewinding recorded operator body language and the surrounding information leading up to detection of the abnormal driving activity and generating labeled data associated with the abnormal driving activity, the labeled data is uploaded to the cloud based network for facilitating ADA model training at the MLC via a virtuous cycle.

Additional features and benefits of the exemplary embodiment(s) of the present invention will become apparent from the detailed description, figures and claims set forth below.

BRIEF DESCRIPTION OF THE DRAWINGS

The exemplary embodiment(s) of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1A:
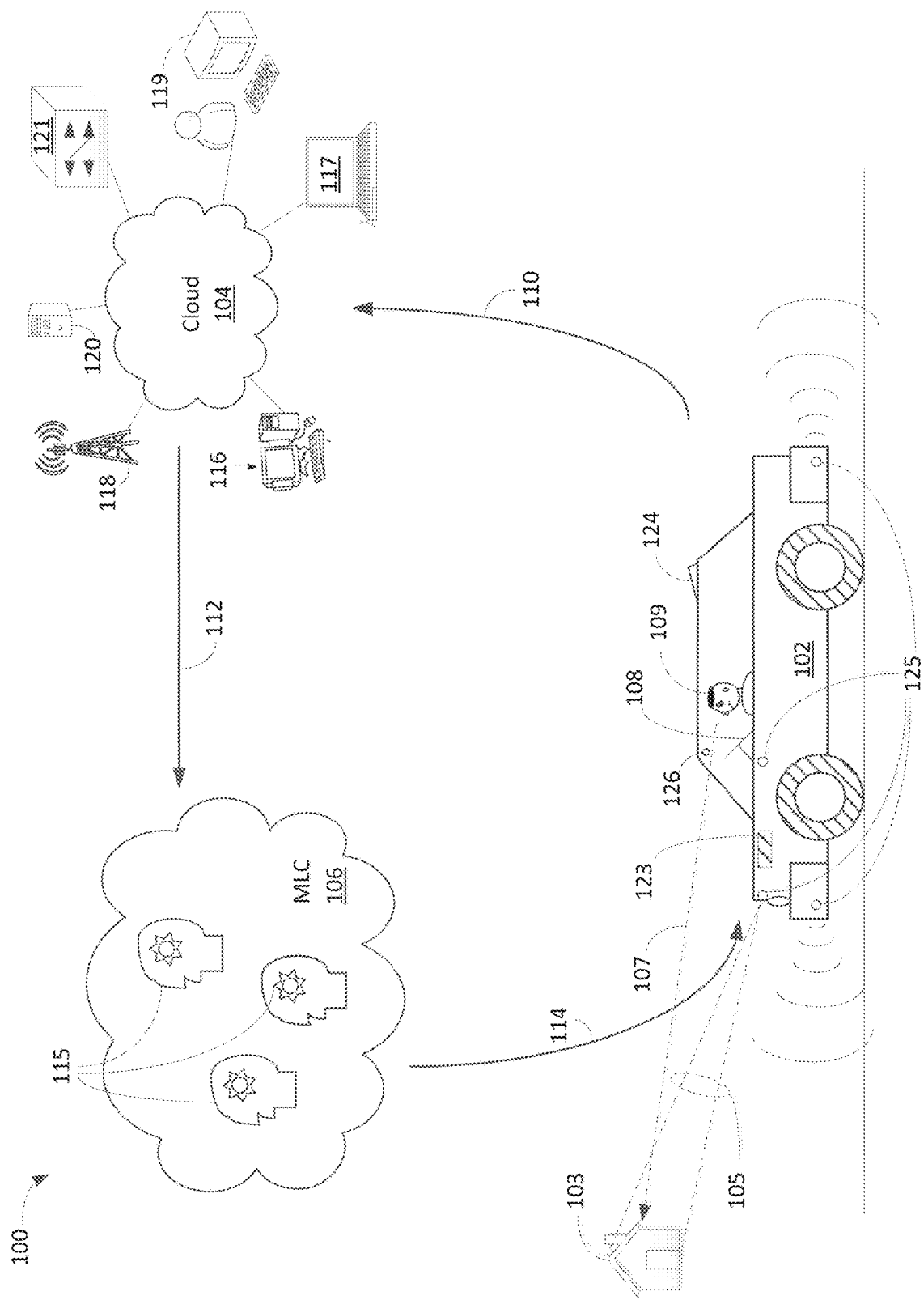
FIGS. 1A-1B are block diagrams illustrating a virtuous cycle facilitating a driver rating system ("DRS") or adaptive driver assistant ("ADA") system which is capable of identifying operator's DR or providing ADA via usage of a virtuous cycle in accordance with one embodiment of the present invention.

Embodiments of the present invention are described herein with context of a method and/or apparatus for facilitating rating of driver via a driver rating system ("DRS") or adaptive driver assistant ("ADA") using an DR or ADA model continuously trained by a virtuous cycle containing cloud based network, containerized sensing device, and machine learning center ("MLC").

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It will, of course, be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming, but would nevertheless be a routine undertaking of engineering for those of ordinary skills in the art having the benefit of embodiment(s) of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

In accordance with the embodiment(s) of present invention, the components, process steps, and/or data structures described herein may be implemented using various types of operating systems, computing platforms, computer programs, and/or general purpose machines. In addition, those of ordinary skills in the art will recognize that devices of a less general purpose nature, such as hardware devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Erasable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

The term "system" or "device" is used generically herein to describe any number of components, elements, sub-systems, devices, packet switch elements, packet switches, access switches, routers, networks, computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

One embodiment of the presently claimed invention discloses a method and/or driver rating system ("DRS") is able to provide driver fingerprint via metadata extraction managed by a DR model trained by a machine learning center ("MLC") coupled to a cloud based network ("CBN"). Driver fingerprint can also be referred to as operator's driving habit, driver pattern, driver behavior, driver experience, driver attitude, and the like. In one embodiment, DRS includes a set of outward facing cameras, a set of inward facing cameras, and a vehicle onboard computer ("VOC"). The set of outward facing cameras mounted on a vehicle is used to collect external images representing a surrounding environment in which the vehicle operates. For example, the outward facing cameras capture real-time images as the vehicle moves across a geographical area. In one aspect, the collecting external images include obtaining real-time images relating to at least one of road, buildings, traffic lights, pedestrian, and retailers.

The set of inward facing cameras mounted in the vehicle is used to collect internal images including operator body expression representing at least operator's attention. The inward facing cameras, for example, are configured to extract metadata associated with operator head pose, gaze direction, and looking at a mobile device. The collecting internal images include a set of interior sensors obtaining data relating to at least one of operator's eyes, facial expression, driver, and passage. For example, the obtaining data also include at least one camera is capable of detecting direction of where the operator is looking. The VOC is configured to determine the identity of operator and current operating style in response to the collected internal images, the collected external images, and historical stored data. In one example, the VOC is configured to communicate with a virtuous cycle to modify the DR model.

In another embodiment, an adaptive driver assistant ("ADA") system or system is capable of providing ADA utilizing a virtuous cycle containing sensors, MLC, and CBN. After monitoring operator body language of an operator captured by a set of interior sensors and capturing surrounding information observed by a set of exterior sensors onboard a vehicle as the vehicle is in motion, the process is able to selectively record data relating to the operator body language and the surrounding information in accordance with a containerized ADA model generated by MLC. Upon detecting an abnormal driving activity in accordance with the operator body language and surrounding information by the ADA model while the vehicle is in driving mode, a process of adaptive advice and assistance by ADA model is generated in response to the surrounding images, the operator body language, and historical data. In one aspect, after rewinding recorded operator body language and the surrounding information leading up to detection of the abnormal driving activity and generating labeled data associated with the abnormal driving activity, the labeled data is uploaded to the cloud based network for facilitating ADA model training at the MLC via a virtuous cycle.

FIG. 1A is a block diagram 100 illustrating a virtuous cycle facilitating a driver rating system ("DRS") or adaptive driver assistant ("ADA") system which is capable of identifying operator's DR or providing ADA via usage of a virtuous cycle in accordance with one embodiment of the present invention. Diagram 100 illustrates a virtuous cycle containing a vehicle 102, CBN 104, and MLC 106. In one aspect, MCL 106 can be located remotely or in the cloud. Alternatively, MCL 106 can be a part of CBN 104. It should be noted that the underlying concept of the exemplary embodiment(s) of the present invention would not change if one or more blocks (circuit or elements) were added to or removed from diagram 100.

Vehicle 102, in one example, can be a car, automobile, bus, train, drone, airplane, truck, and the like, and is capable of moving geographically from point A to point B. To simplify forgoing discussing, the term "vehicle" or "car" is used. Vehicle 102 includes wheels with ABS (anti-lock braking system), body, steering wheel 108, exterior or outward facing cameras 125, interior (or 360° (degree)) or inward facing camera 126, antenna 124, onboard controller or VOC 123, and operator (or driver) 109. It should be noted that outward facing cameras and/or inward facing cameras 125-126 can be installed at front, side-facing, stereo, and inside of vehicle 102. In one example, vehicle 102 also includes various sensors which senses information related to vehicle state, vehicle status, driver actions. For example, the sensors, not shown in FIG. 1A, are able to collect information, such as audio, ABS, steering, braking, acceleration, traction control, windshield wipers, GPS (global positioning system), radar, ultrasound, lidar (Light Detection and Ranging), and the like.

VOC or onboard controller 123 includes CPU (central processing unit), GPU (graphic processing unit), memory, and disk responsible for gathering data from outward facing or exterior cameras 125, inward facing or interior cameras 126, audio sensor, ABS, traction control, steering wheel, CAN-bus sensors, and the like. In one aspect, VOC 123 executes DR or ADA model received from MLC 106, and interfaces with antenna 124 to communicate with CBN 104 via a wireless communication network 110. Note that wireless communication network includes, but not limited to, WIFI, cellular network, Bluetooth network, satellite network, or the like. A function of VOC 123 is to gather or capture real-time surrounding information as well as exterior information when vehicle 102 is moving.

CBN 104 includes various digital computing systems, such as, but not limited to, server farm 120, routers/switches 121, cloud administrators 119, connected computing devices 116-117, and network elements 118. A function of CBN 104 is to provide cloud computing which can be viewed as on-demand Internet based computing service with enormous computing power and resources. Another function of CBN 104 is to improve or refine DR or ADA labeled data via correlating captured real-time data with relevant cloud data. The refined DR or ADA labeled data is subsequently passed to MLC 106 for model training via a connection 112.

MLC 106, in one embodiment, provides, refines, trains, and/or distributes models 115 such as DR or ADA model based on information or data such as DR or ADA labeled data provided from CBN 104. It should be noted that the machine learning makes DR model based on models generated and maintained by various computational algorithms using historical data as well as current data. A function of MLC 106 is that it is capable of pushing information such as revised DR or ADA model to vehicle 102 via a wireless communications network 114 in real-time.

To identify or collect current operator driving style via vehicle 102, an onboard DR or ADA model which could reside inside of VOC 123 receives a triggering event or events from built-in sensors such as driver body language, external surrounding condition, internal detected images, ABS, wheel slippery, turning status, engine status, and the like. The triggering event or events may include, but not limited to, activation of ABS, texting, drinking, smoking, arguing, playing, fighting, rapid steering, rapid breaking, excessive wheel slip, activation of emergency stop, and on. Upon receiving triggering events via vehicular status signals, the recording or recorded images captured by inward facing camera or 360 camera are rewound from an earlier time stamp leading to the receipt of triggering event(s) for identifying DR or ADA labeled data which contains images considered to be dangerous driving. After correlation of DR or ADA labeled data with historical sampling data at CBN, the DR or ADA model is retrained and refined at MLC 106. The retrained DR or ADA model is subsequently pushed back onto vehicle 102.

It should be noted that driver "fingerprinting" is computed based on time-series from multiple sensor inputs and extracted data. Using machine learning techniques, the time-series data (both raw and extracted metadata) can be used to calculate a feature vector that places the "current style" of the driver into an n-dimensional space. For example, an area of n-dimensional space can be associated with "aggressive driving," "inattentive driving," "driving while intoxicated by alcohol," et cetera. The utility of such composition can be used along several area, such as driver identification, detection of driver impairment, detection of driver skill level, driver attentiveness, various other forms of impairment, and various other useful metrics for rating drivers.

By repeatedly calculating the categorization of a drivers recent driving activity into this multi-dimensional space, and subtracting those vectors, a "distance vector" between any two calculated vectors can be computed, and the components of that delta distance vector carries meaning that maps onto real-world driving styles or behaviors that are useful to determine. For example, distracted driving would "move" the point in space in a particular direction while alcohol impaired driving can cause to move in a different direction. Also, dementia can render the point in space to move in another direction and road rage can also redirect the point in space to move in a different direction. Thus, the underlying rating system can be used not just to "rate" the driver, but also to detect changes that could have impact on safety.

During an operation, inward facing camera 126 captures facial images of driver or operator 109 including the location in which operator's eyes focusing. Upon verifying with CBN 104, a focal direction 107 of operator 109 is identified. After obtaining and processing external images relating to focal direction 107, a possible trajectory 105 in which the location is looked at is obtained. Trajectory 105 and focal direction 107 are subsequently processed and combined in accordance with stored data in the cloud. The object, which is being looked at by operator 109, is identified. In this example, the object is a house 103 nearby the road. A driver rating and/or adaptive driver assistant can be implemented based on the internal and external images plus cloud data.

An advantage of using DRS or ADA is to reduce traffic accidents and enhance public safety. While DR model can provide a rating for the driver, ADA can provide assistance to driver to improve driver's skill and awareness.

Figure 1B:
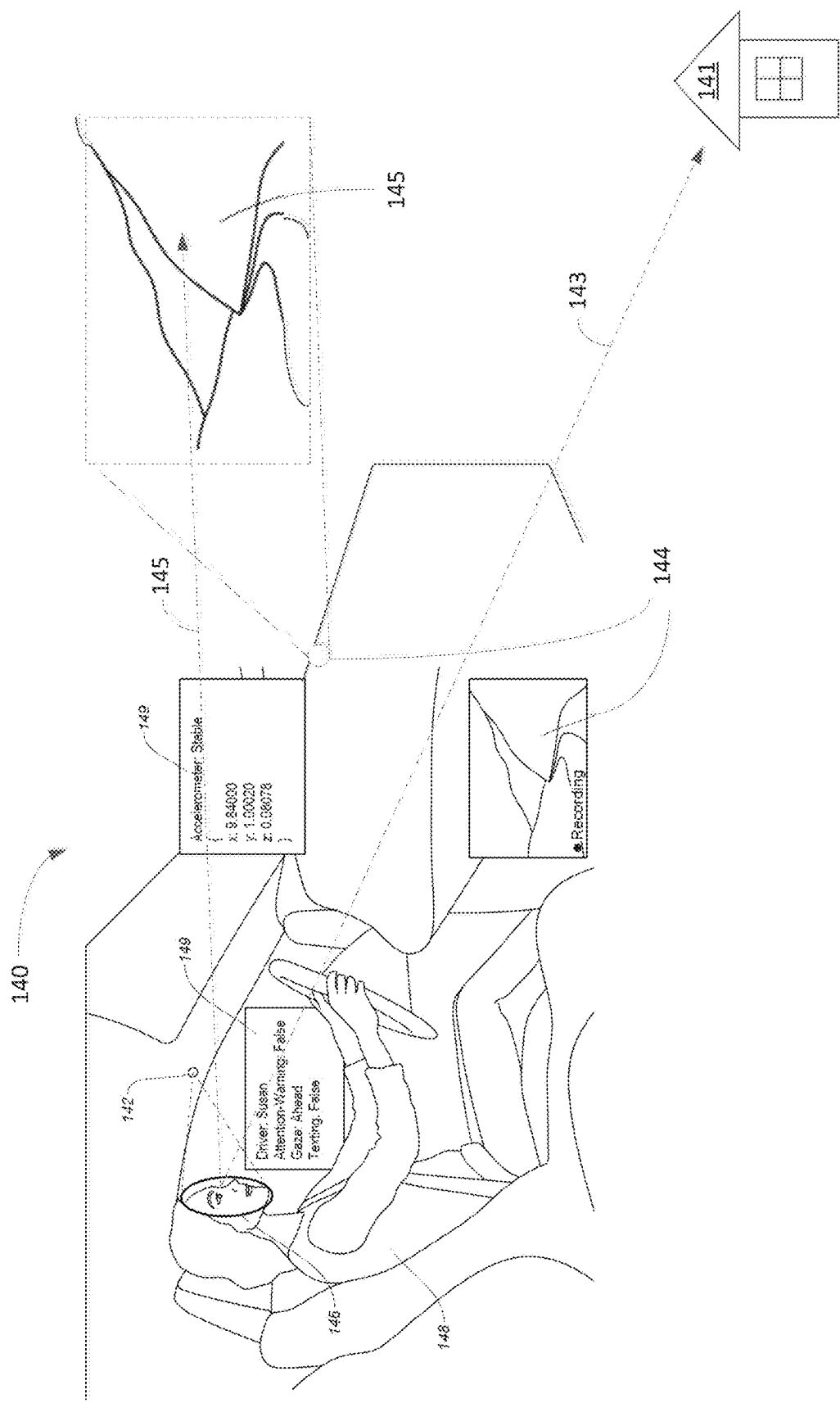

FIG. 1B illustrates a block diagram 140 showing an operator or driver monitored by DRS or ADA able to rate driver's driving pattern or habit via a virtuous cycle in accordance with one embodiment of the present invention. Diagram 140 illustrates a driver 148, inward facing camera(s) 142, and exterior camera 144. In one aspect, camera 142, also known as interior camera or 360 camera, monitors or captures driver's facial expression 146 and/or driver (or operator) body language. Upon reading status 149 which indicates stable with accelerometer, ahead with gaze, hands on steering wheel (no texting), DRS concludes that driver is behaving normally or abnormally.

In one embodiment, DRS or ADA is able to detect which direction driver 148 is looking, whether driver 148 is distracted, whether driver 148 is texting, whether identity of driver is determined via a facial recognition process, and/or where driver 148 pays attention. It should be noted that the car may contain multiple forward facing cameras (or 360-degree camera(s)) 144 capable of capturing a 360 view which can be used to correlate with other views to identify whether driver 148 checks back-view mirror to see cars behind the vehicle or checks at side view of vehicle when the car turns. Based on observed real-time data, the labeled data showing looking at the correct spots based on traveling route of car can illustrate where the driver pays attention. Alternatively, the collected images or labeled data can be used to retrain DR or ADA model which may rate driver 148. ADA model will determine whether an adequate assistance may be required.

During an operation, the interior images captured by inward facing camera(s) 142 can show a location in which operator 148 is focusing based on relative eye positions of operator 148. Once the direction of location such as direction 145 is identified, DRS or ADA obtains external images captured by outward facing camera(s) 144. After identifying image 145 is where operator pays attention based on direction 145, the image 145 is recorded and process. Alternatively, if DRS or ADA expects operator 148 should look at the direction 145 based on current traveling speed, whether condition, visibility, and traffic condition, operator 148 actually is looking at a house 141 based in trajectory view 143 based on captured images, an assistance signal will be activated.

Figure 1C:
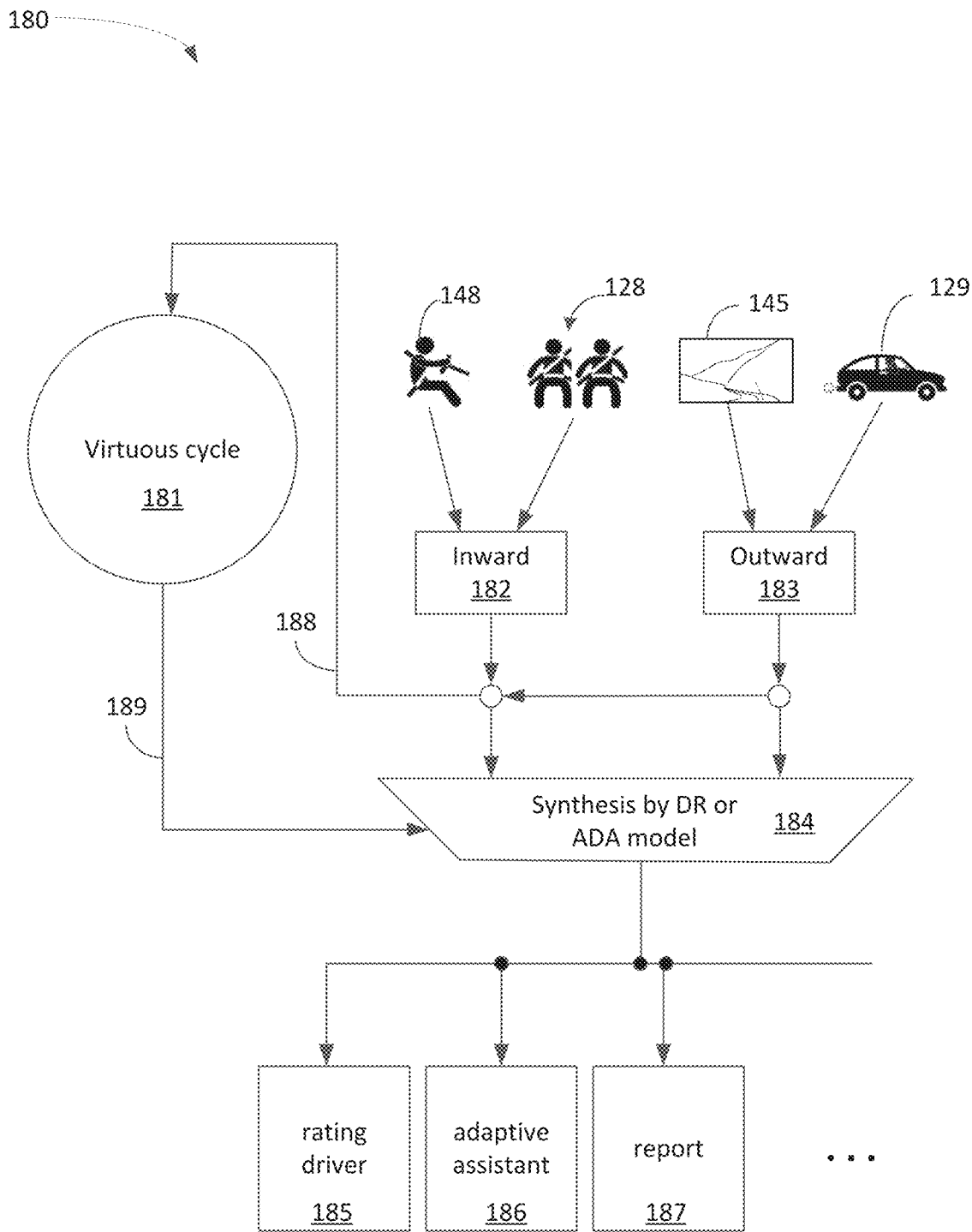
FIGS. 1C-1E are logic block diagrams illustrating DR model and/or ADA model containing inward and outward facing cameras via a virtuous cycle in accordance with one embodiment of the present invention.

FIG. 1C is logic block diagram 180 illustrating DR model and/or ADA model containing inward and outward facing cameras via a virtuous cycle in accordance with one embodiment of the present invention. Diagram 180 includes a virtuous cycle 181, inward facing cameras 182, outward facing cameras 183, DR or ADA model 184, and outputs, wherein the outputs include rating driver 185, adaptive assistant 186, and report 187. It should be noted that the underlying concept of the exemplary embodiment(s) of the present invention would not change if one or more blocks (components or elements) were added to or removed from diagram 180.

Inward facing cameras 182, in one embodiment, capture internal images such as driver 148 and passengers 128 continuously with a predefined time interval between frames. For example, 100 milliseconds per frame. The captured internal images are regularly uploaded to virtuous cycle 181 via connection 188 as labeled internal data. Outward facing camera 183, in one example, capture external images such as car 129 and road 145 continuously with a predefined time interval between frames. The captured external images are also uploaded to virtuous cycle 181 via connection 188 as labeled external data.

DR or ADA model 184 receives real-time images or data from inward facing cameras 182 and outward facing cameras 183. In one aspect, DR or ADA model 184 also receives historical data from virtuous cycle 181 via connection 189. In one embodiment, based on real-time internal image captured by inward facing camera 182, virtuous cycle 181 can determine or substantiate the identity of the driver. Upon synthesizing real-time internal and external images with historical data, DR or ADA model 184 is able to generate a set of outputs based on the applications. For example, DR model can provide a rating 185 indicating driver's current driving condition as well as driver's driving style via statistic value. ADA model 184 can provide adaptive assistant 186 based on whether the driver is needed or not. In addition, an insurance company may want to know the driver's driving style to assess risks for continuing insuring the driver.

In one embodiment, DRS employs one or more video cameras and input sensors to extract what is happening outside of a vehicle. In addition, video cameras facing the driver extract metadata about the operator, such as head pose, gaze direction, activities such as texting, talking on the phone, interacting with the audio system, looking at mobile device, et cetera. By combining these two extracted metadata streams (inward and outward facing), a "rating" model of the driver can be constructed. The extracted metadata can include things such as tailgating, excessive lane changes, speeding, running red lights, et cetera. The rating can be used in various situations, for example, 1) to automatically generate a "report card" for a teenaged driver that can be electronically delivered to their parent, and 2) to enable a fleet of rental vehicles to make determinations about the safety of their drivers.

The inward facing camera can also be used to detect and recognize the person currently driving the vehicle. The images recognizing personal features would allow the system to collect driver specific data including driving habit, skill, pattern, and the like.

DRS using inward and outward facing metadata extraction together with cloud based historical data can improve accuracy of driver's rating. For example, a data pipeline of audio, video, and sensor data flowing through a series of software elements, and the use of both externally facing as well as internally facing video cameras, the system being described collects a great deal of real-time "situational" data. For example, the situations, such as, "it's raining", "the current lane is narrower than typical", "there are many parked cars in the adjacent lane, with pedestrian activity near an upcoming car", "the current speed limit is 25 mph", "the car ahead is 26 feet away and the current speed is 45 mph", can be detected by a real-time metadata extracting system. In addition, the situation within the car is also being monitored and analyzed, yielding information such as "driver is texting", or "driver is looking at navigation system", or "driver turned right but didn't use turn signal indicator", or "driver ran a red light", or "driver is making many lane changes and cutting off vehicles inappropriately", "passengers in the back seat are moving around more than normally", or "passengers in back seat are loud and distracting", et cetera.

DRS also uses metrics that are compared to normal for creating customized report. For example, the combination of two streams of metadata, covering the real-time situation outside the vehicle as well as inside the vehicle, enables the system to construct a rating model of how good or bad the drivers choices are compared to the average driver. The differences between the driver and the norm yield metrics for a "report card" detailing how well the driver does across a variety of areas of safe driving. This report can be delivered to the individual, and also to the car owner or parent.

Note that having a model for rating drivers has many applications. Fleets of cars could use it to have a record of how individual drivers are performing. Parents could use the report card to have an idea of how safe their teen driver is driving when they are not with the parent(s). Given that many types of accidents are likely preceded with "near accidents" that go unreported, having an early reporting mechanism that unsafe driving is taking place could be used to avert many accidents. Also, rental fleets of cars could use the driver metrics to gain an understanding of the driving characteristics of their rental customers, and use the rating system to encourage good drivers with discounts, or eliminate dangerous drivers from their customer base.

ADA, in one aspect, uses one or more video cameras and input sensors to extract what is happening outside of a vehicle. Video cameras facing the driver extract metadata about the operator, such as head pose, gaze direction, activities such as texting, talking on the phone, interacting with the audio system, looking at mobile device, et cetera. ADA can recognize the current driver and maintain a profile of that driver, such as "novice driver," "expert driver," "license restricted to driving only other licensed drivers," et cetera. The combination of all this information is used to create an adaptive "driver advice and assistant" function.

ADA using inward and outward facing metadata extraction with two extracted metadata streams (inward and outward facing) allows the adaptive warning system to make appropriate decisions about when and how to give driving advice. The extracted metadata can include things such as tailgating, excessive lane changes, speeding, running red lights, et cetera. It also includes external situation information, such as "heavy rain," "narrow lane," "right turn only lane," "no right on red," "school zone speed limit of 25 mph," et cetera.

In a driving situation, ADA is aware of a tension between giving too much advice to a novice driver to a point of distracting them and giving too little advice in situations where it's important for them to receive advice for improving driving behavior. ADA keeps track of the history of situations that the driver has encountered how they have handled them, whether previous advice has been given, et cetera. ADA, in one example, uses historical data or information to adapt to either more or less proactive advice. For example, if a driver fails to use their turn signal prior to turns, the system won't choose to tell them at every single infraction. ADA, however, can notice a pattern and use that to decide to occasionally give advice. Note that the system has a great deal of information available to fine-tune the system behavior. For instance, failure to turn on your turn signal when there are no cars in sight in any direction is less of an infraction that failure to do so when there are cars behind and oncoming cars executing turns. In one aspect, ADA is capable of warning of excessive tailgating, warning that given the rainy conditions a slower speed is appropriate, warning that when external temperatures are right around the edge of the freezing point of water, road conditions can be dangerous, et cetera.

Figure 1D:
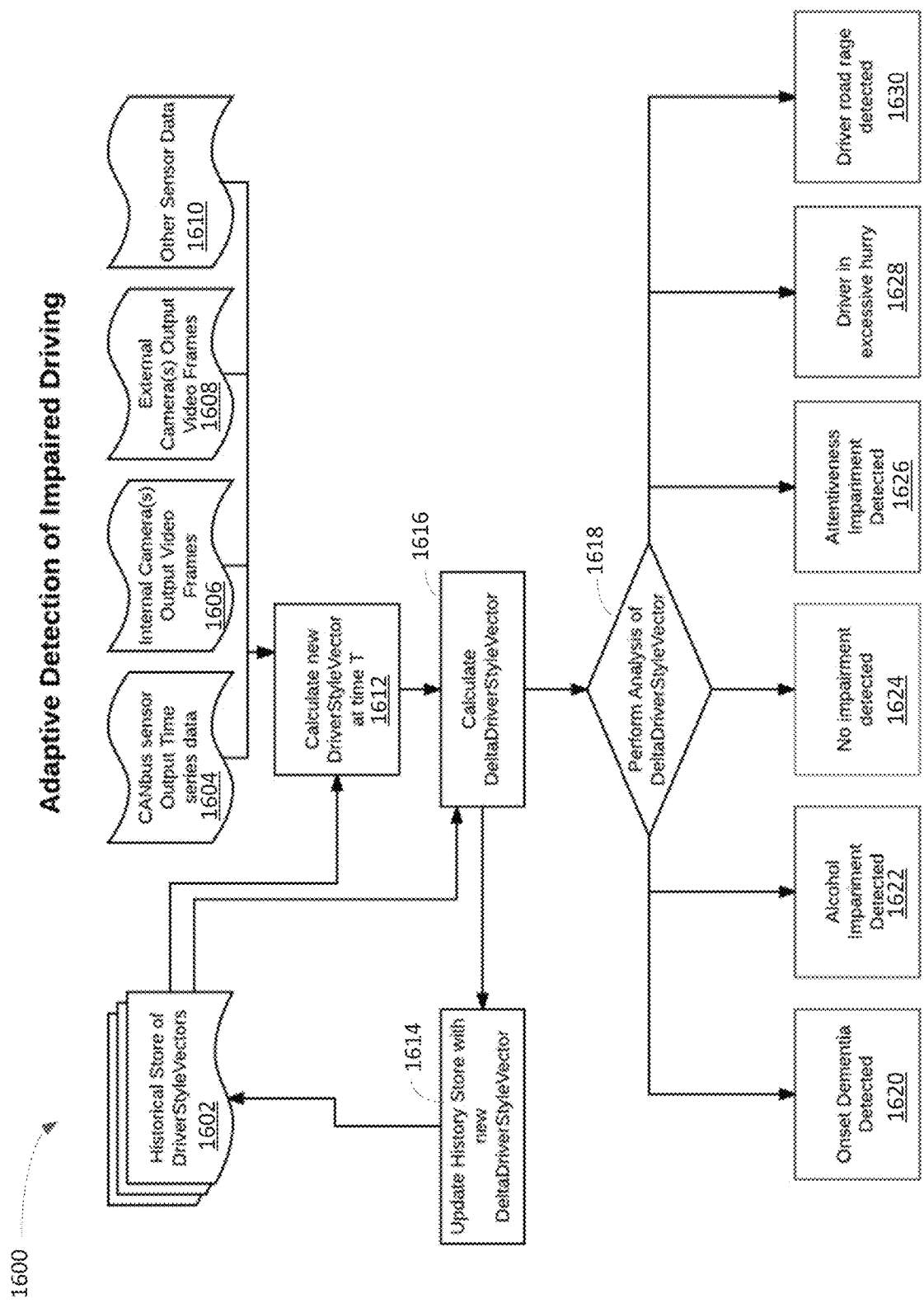

FIG. 1D is a logic block diagram 1600 illustrating DR model containing inward and outward facing cameras via a virtuous cycle in accordance with one embodiment of the present invention. Diagram 1600 shows a logic flow in which block 1612 is able to calculate new driver style vector at a given time in accordance with inputs from blocks 1604-1610 and block 1602. While input data block 1604 provides output series data from CANbus sensor(s), input block 1606 provides internal video frames captured by internal cameras. Input block 1608 supplies external video frames captured by external camera(s), and block 1610 may provide additional sensed data from other sensors. Block 1602, which can be maintained by the virtuous cycle, provides historical stored data associated with the diver style vectors.

Block 1616 calculates delta for the driver style vector based on the output value of block 1612 and historical stored data from the virtuous cycle. A portion of output data from block 1616 is fed to block 1614 for updating historical stored data in view of new delta of driver style vector. Another portion of output data from block 1616 is fed to block 1618 to perform and analyze delta driver style vector. In one aspect, block 1620 is able to detect dementia associated with the driver based on input from block 1618. Block 1622, in one example, is capable of detecting alcohol related impairment based on input from block 1618. Block 1624, in one example, is capable of detecting no impairment based on input from block 1618. Block 1626, in one aspect, is capable of detecting attentiveness impairment based on input from block 1618. Block 1628, in one embodiment, is capable of detecting a scenario in which the driver is in excessive hurry based on input from block 1618. Block 1628, in one embodiment, is capable of detecting a scenario in which the driver is in a road rage based on input from block 1618.

Figure 1E:
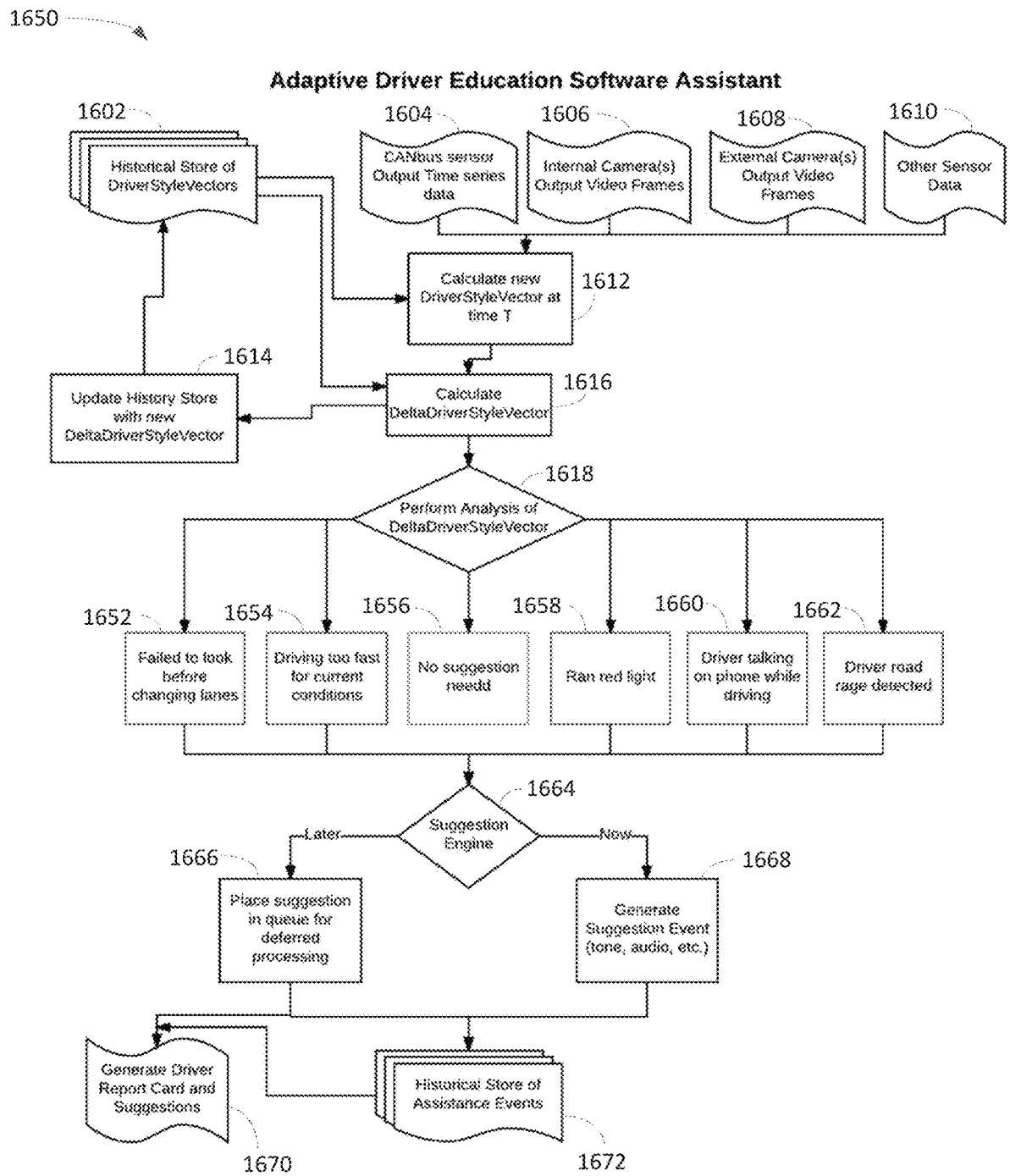

FIG. 1E is a logic block diagram 1650 illustrating ADA model containing inward and outward facing cameras via a virtuous cycle in accordance with one embodiment of the present invention. Diagram 1650 shows a logic flow in which block 1612 is able to calculate new driver style vector at a given time in accordance with inputs from blocks 1604-1610 and block 1602. While input data block 1604 provides output series data from CANbus sensor(s), input block 1606 provides internal video frames captured by internal cameras. Input block 1608 supplies external video frames captured by external camera(s), and block 1610 may provide additional sensed data from other sensors. Block 1602, which can be maintained by the virtuous cycle, provides historical stored data associated with the diver style vectors.

Block 1616 calculates delta for the driver style vector based on the output value of block 1612 and historical stored data from the virtuous cycle. A portion of output data from block 1616 is fed to block 1614 for updating historical stored data in view of new delta of driver style vector. Another portion of output data from block 1616 is fed to block 1618 to perform and analyze delta driver style vector. In one aspect, block 1652 is able to detect a scenario in which the driver failed to look before changing lanes based on input from block 1618. Block 1654, in one example, is capable of detecting a scenario in which the driver drives too fast for current conditions based on input from block 1618. Block 1656, in one example, is capable of detecting no need of making any suggestions based on input from block 1618. Block 1658, in one aspect, is capable of detecting a scenario in which the driver had ran through a red light based on input from block 1618. Block 1660, in one embodiment, is capable of detecting a scenario in which the driver is talking on a phone while driving based on input from block 1618. Block 1662, in one embodiment, is capable of detecting a scenario in which the driver is in a road rage based on input from block 1618.

After aggregating output from blocks 1652-1662, block 1664 is able to process the information based on whether a suggestion or advice should be activated now or later. If ADA model decides that the suggestion should be issued now, an audio, tone, visual, haptic feedback, and combination of audio, visual, and/or haptic feedback is generated in connection to the suggestion event. The suggestion is subsequently forwarded to historical store of assistance events at block 1672 and block 1670 after issuance of the suggestion. Block 1670 is capable of generating driver report card and suggestions. If, however, ADA model decides that the suggestion should be issued later, a suggestion is placed in a queue for deferred processing at block 1666. The deferred suggestion is subsequently forwarded to historical store of assistance events at block 1672 and block 1670. Block 1670 is capable of generating driver report card and suggestions.

It should be noted that a problem in novice drivers is that they must, at some point, switch from having an instructor in the car with them, to driving alone and making all the decisions by themselves. This creates a big discontinuity, where the new driver goes from having real-time advice and feedback on their driving, to having none at all.

ADA, in one embodiment, creates the ability to selectively give advice or inform a novice driver of how to improve the safety and quality of their driving. Because the feature vector for a driver has a rich set of parameters that mean something, they can be used to determine which "tips or suggestions" to offer, and to decide when they should be offered. For example, if a novice driver is driving too fast, it may make sense to tell them to slow down immediately. Alternatively, it may be better in some circumstances to wait until they end their drive to give them advice. In an alternative embodiment, ADA sends them email with "tips" for how to improve their driving depending on the circumstances and driver's personality.

Figure 1F:
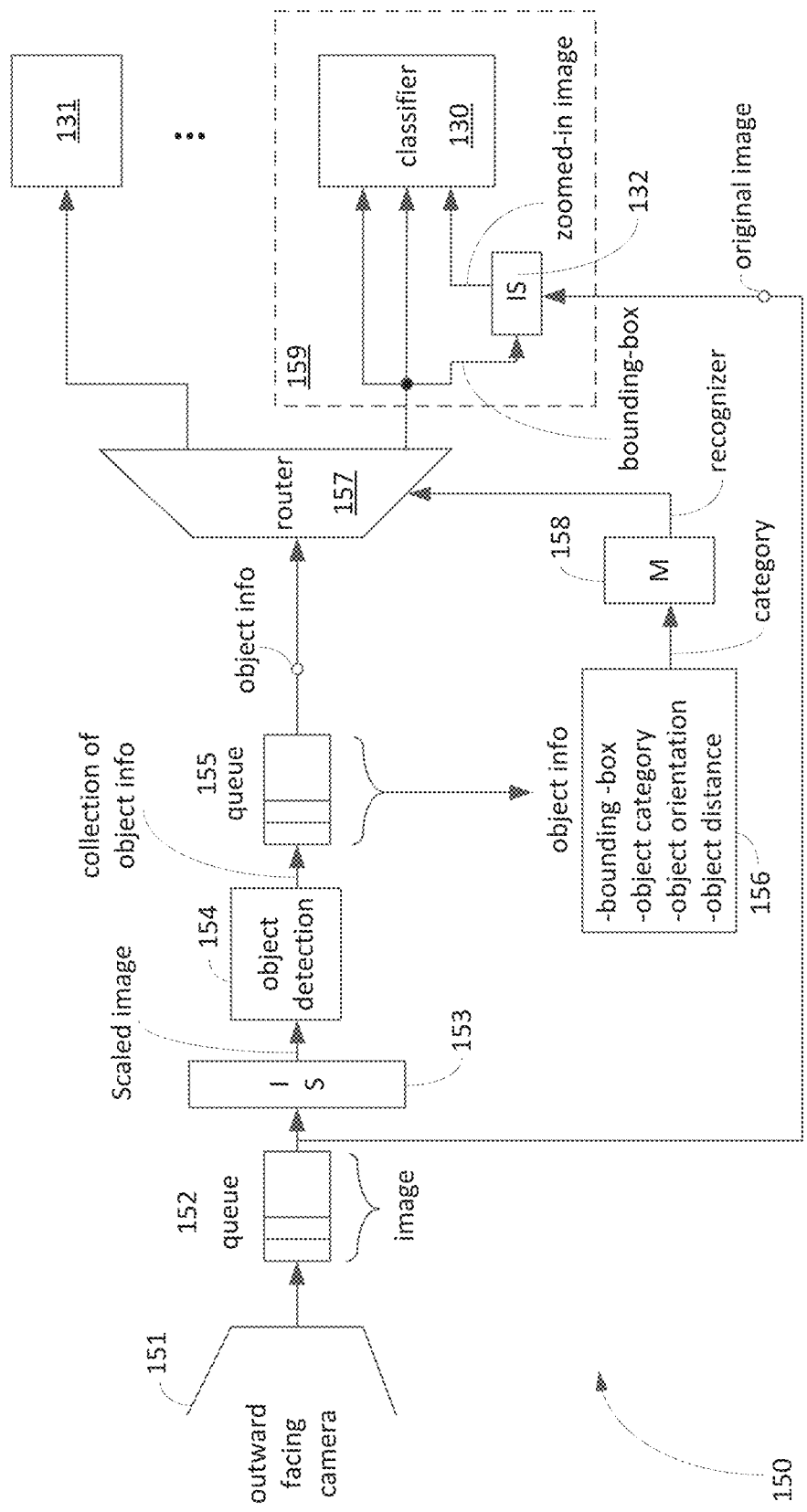
FIGS. 1F-1H is a block diagram illustrating a pipeline process of outward facing camera capable of identifying and classifying detected object(s) using a virtuous cycle in accordance with one embodiment of the present invention.

FIG. 1F is a logic block diagram illustrating a pipeline process 150 of outward facing camera capable of identifying and classifying detected object(s) using a virtuous cycle in accordance with one embodiment of the present invention. Outward facing camera 151 collects images and the images are stored in a queue 152. After scaling the images by image scaling component 153, the scaled image is forwarded to object detection 154. Object detection 154 generates a collection of objection information which is forwarded to queue 155. The object information which includes bounding-box, object category, object orientation, and object distance is forwarded to component 156 and router 157. Upon categorizing the object information at block 156, the categorized data is forwarded to map 158. After recognizing the object based on map 158, the recognizer is forwarded to router 157. After routing information at router 157, the output images are forwarded to block 159 which uses classifier 130-131 to classify the images and/or objects.

Pipeline process 150 illustrates a logic processing flow which is instantiated for the purpose of processing incoming data, extracting metadata on a frame by frame or data packet basis, and forwarding both frames and metadata packets forward through the pipeline. Each stage of the pipeline can contain software elements that perform operations upon the current audio or video or sensor data frame. The elements in the pipeline can be inserted or removed while the pipeline is running, which allows for an adaptive pipeline that can perform different operations depending on the applications. The pipeline process is configured to adapt various system constraints that can be situationally present. Additionally, elements in the pipeline can have their internal settings updated in real-time, providing the ability to "turn off," "turn on" elements, or to adjust their configuration settings on the fly.

Pipeline process 150 includes a metadata packet schema which includes name/value pairs with arbitrary nesting and basic primitive data types such as arrays and structures that is used to create a self-describing and both machine and human readable form of the extracted real-time metadata flowing through the system. Such a generalized schema allows multiple software components to agree on how to describe the high level events that are being captured and analyzed and acted upon by the system. For example, a schema is constructed to describe the individual locations within a video frame of a person's eyes, nose, mouth, chin line, etc. Such a data structure allows a downstream software component to infer even higher level events, such as "this person is looking up at 34 degrees above the horizon" or "this person is looking left 18 degrees left of center." The process can subsequently construct additional metadata packets and insert them into the stream, resulting in higher level semantic metadata that the system is able to act upon.

Figure 1G:
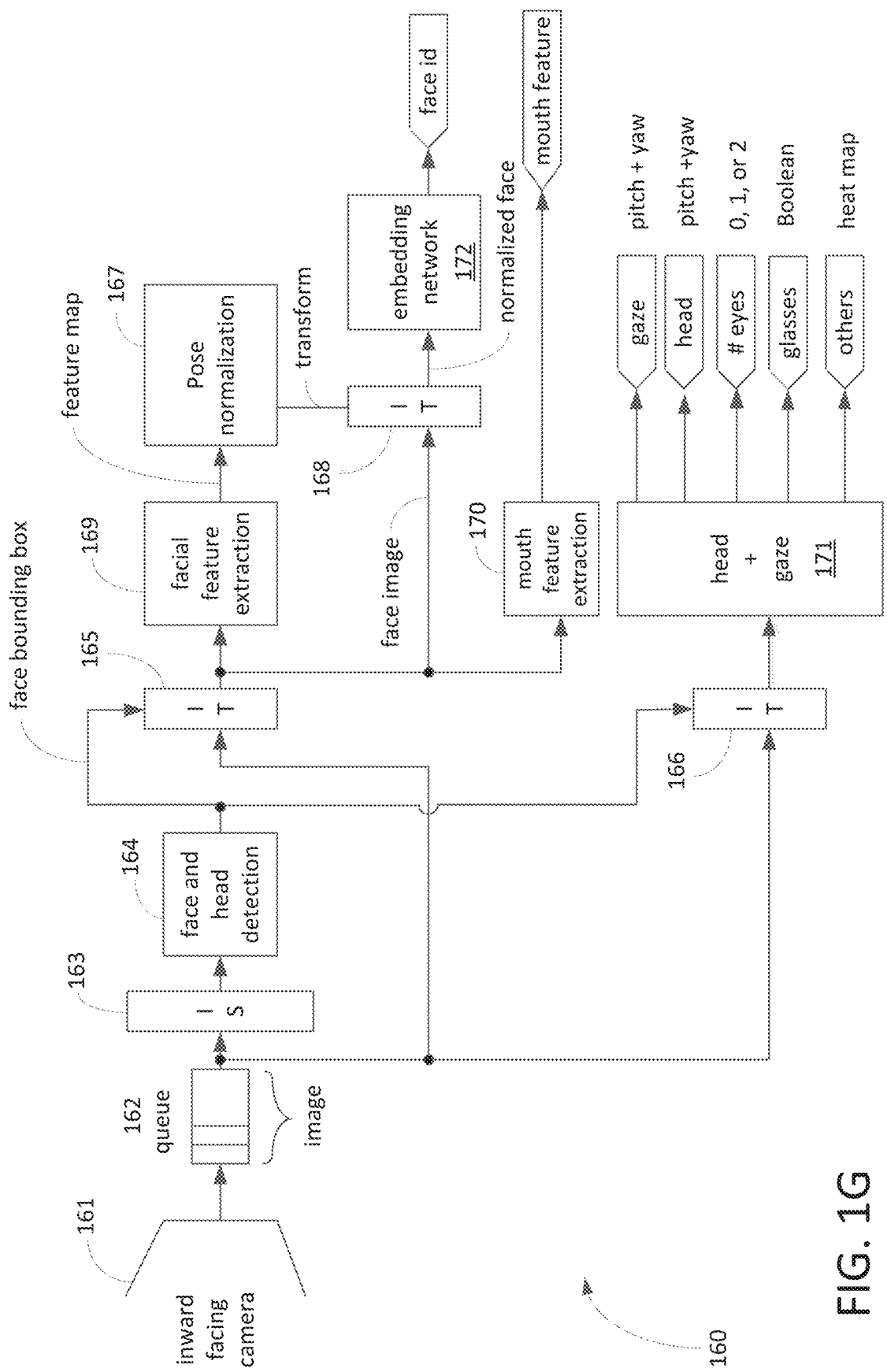

FIG. 1G is a logic block diagram illustrating a pipeline process 160 capable of identifying and classifying face detection, head and gaze orientation, and mouth features using a virtuous cycle in accordance with one embodiment of the present invention. Inward facing camera 161 collects images and the images are stored in a queue 162. After scaling the images by image scaling component 163, the scaled image is forwarded to face and head detection 164. The output of detection 164 is forwarded to image transform ("IT") components 165-166. After transformation, the transformed image is forwarded to blocks 169-170. After facial feature extraction in block 169, the feature map is forwarded to block 167 for pose normalization. Block 168 receives face images from IT component 165 and transformed images from block 167; the normalized face image is forwarded to block 172. Upon processing normalized face with embedding network at block 172, a face ID is identified.

Block 170 extracts mouth feature and generates mouth feature(s) of driver. Block 171 processes head and gaze based on output of IT component 166 which receives information with both scaled and unscaled images. In one example, block 171 is capable of generating various features, such as gaze, head, number of eyes, glasses, and the like.

Figure 1H:
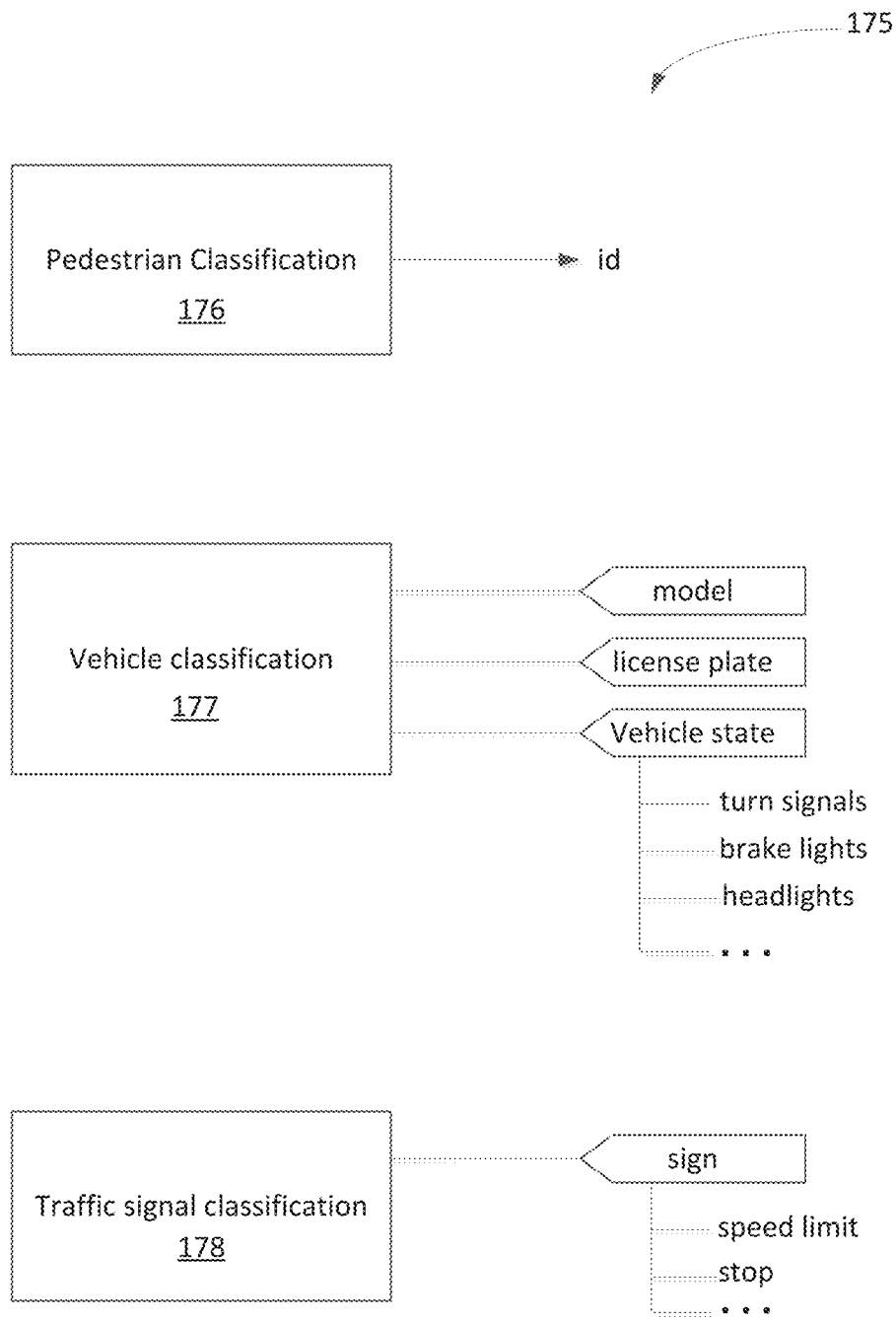

FIG. 1H is a logic block diagram 175 illustrating a process of classifying detected object(s) using a virtuous cycle in accordance with one embodiment of the present invention. Block 176 is a software element used to classify a pedestrian based on collected external images captured by outward facing cameras. Based on collected data and historical data, pedestrian may be identified. Block 177 is a software element used to classify a vehicle based on collected external images captured by outward facing cameras. Based on collected data and historical data, vehicle information can be identified. The exemplary classification information includes model of the vehicle, license plate, state of vehicle registration, and the like. In addition, formation such as turn-signals, brake lights, and headlights can also be classified via facilitation of virtuous cycle. Block 178 is a software element used to classify traffic signals or conditions according to collected external images captured by outward facing cameras. For example, according to collected data as well as historical data, the traffic signal can be classified. The exemplary classification includes sign, speed limit, stop sign, and the like.

Figure 2A:
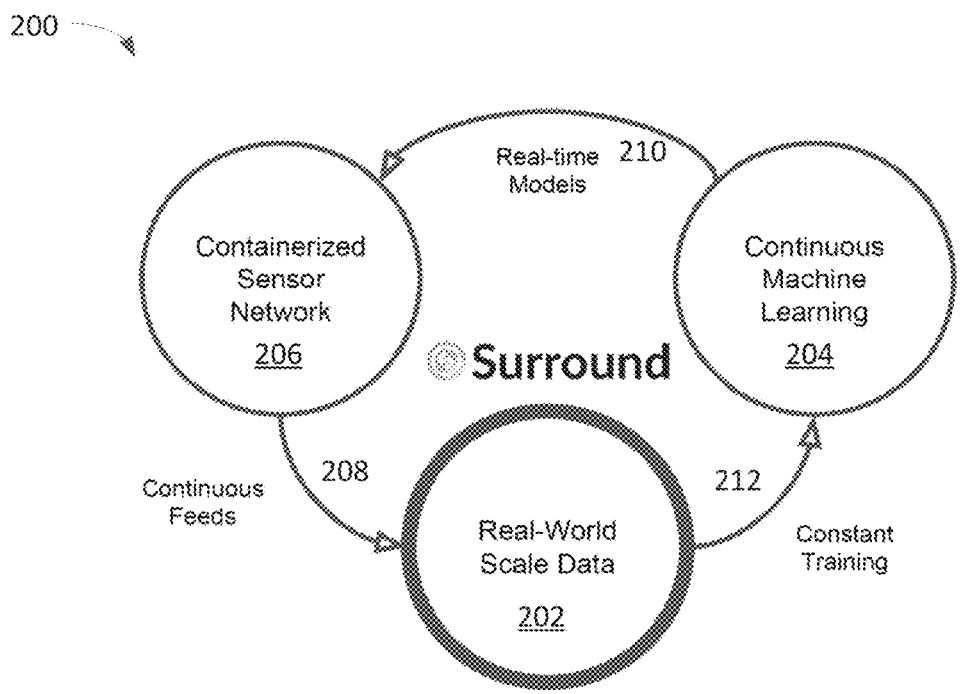
FIGS. 2A-2B are block diagrams illustrating a virtuous cycle capable of facilitating DR or ADA model detection in accordance with one embodiment of the present invention.

FIG. 2A is a block diagram 200 illustrating a virtuous cycle capable of detecting or monitoring DR and/or ADA in accordance with one embodiment of the present invention. Diagram 200, which is similar to diagram 100 shown in FIG. 1A, includes a containerized sensor network 206, real-world scale data 202, and continuous machine learning 204. In one embodiment, continuous machine learning 204 pushes real-time models to containerized sensor network 206 as indicated by numeral 210. Containerized sensor network 206 continuously feeds captured data or images to real-world scale data 202 with uploading in real-time or in a batched format. Real-world scale data 202 provides labeled data to continuous machine learning 204 for constant model training as indicated by numeral 212. It should be noted that the underlying concept of the exemplary embodiment(s) of the present invention would not change if one or more blocks (or elements) were added to or removed from FIG. 2A.

To simplify forgoing discussion, DRS and DR model are described how they are being integrated into the virtuous cycle. It should be noted that ADA and ADA model should be similar to DRS and DR model to couple to the virtuous cycle.

The virtuous cycle illustrated in diagram 200, in one embodiment, is configured to implement DRS wherein containerized sensor network 206 is similar to vehicle 102 as shown in FIG. 1A and real-world scale data 202 is similar to CBN 104 shown in FIG. 1A. Also, continuous machine learning 204 is similar to MCL 106 shown in FIG. 1A. In one aspect, containerized sensor network 206 such as an automobile or car contains a containerized sensing device capable of collecting surrounding information or images using onboard sensors or sensor network when the car is in motion. Based on the DR model, selective recording the collected surrounding information is selectively recorded to a local storage or memory.

Real-world scale data 202, such as cloud or CBN, which is wirelessly coupled to the containerized sensing device, is able to correlate with cloud data and recently obtained DR data for producing labeled data. For example, real-world scale data 202 generates DR labeled data based on historical DR cloud data and the surrounding information sent from the containerized sensing device.

Continuous machine learning 204, such as MLC or cloud, is configured to train and improve DR model based on the labeled data from real-world scale data 202. With continuous gathering data and training DR model(s), the DRS will be able to learn, obtain, and/or collect all available DRs for the population samples.

In one embodiment, a virtuous cycle includes partitionable Machine Learning networks, training partitioned networks, partitioning a network using sub-modules, and composing partitioned networks. For example, a virtuous cycle involves data gathering from a device, creating intelligent behaviors from the data, and deploying the intelligence. In one example, partition idea includes knowing the age of a driver which could place or partition "dangerous driving" into multiple models and selectively deployed by an "age detector." An advantage of using such partitioned models is that models should be able to perform a better job of recognition with the same resources because the domain of discourse is now smaller. Note that, even if some behaviors overlap by age, the partitioned models can have common recognition components.

It should be noted that more context information collected, a better job of recognition can be generated. For example, "dangerous driving" can be further partitioned by weather condition, time of day, traffic conditions, et cetera. In the "dangerous driving" scenario, categories of dangerous driving can be partitioned into "inattention", "aggressive driving", "following too closely", "swerving", "driving too slowly", "frequent breaking", deceleration, ABS event, et cetera.

For example, by resisting a steering behavior that is erratic, the car gives the driver direct feedback on their behavior—if the resistance is modest enough then if the steering behavior is intentional (such as trying to avoid running over a small animal) then the driver is still able to perform their irregular action. However, if the driver is texting or inebriated then the correction may alert them to their behavior and get their attention. Similarly, someone engaged in "road rage" who is driving too close to another car may feel resistance on the gas pedal. A benefit of using DRS is to identify consequences of a driver's "dangerous behavior" as opposed to recognizing the causes (texting, etc.). The Machine Intelligence should recognize the causes as part of the analysis for offering corrective action.

In one aspect, a model such as DR model includes some individual blocks that are trained in isolation to the larger problem (e.g. weather detection, traffic detection, road type, etc.). Combining the blocks can produce a larger model. Note that the sample data may include behaviors that are clearly bad (ABS event, rapid deceleration, midline crossing, being too close to the car in front, etc.). In one embodiment, one or more sub-modules are built. The models include weather condition detection and traffic detection for additional modules intelligence, such as "correction vectors" for "dangerous driving."

An advantage of using a virtuous cycle is that it can learn and detect object such as DR in the real world.

Figure 2B:
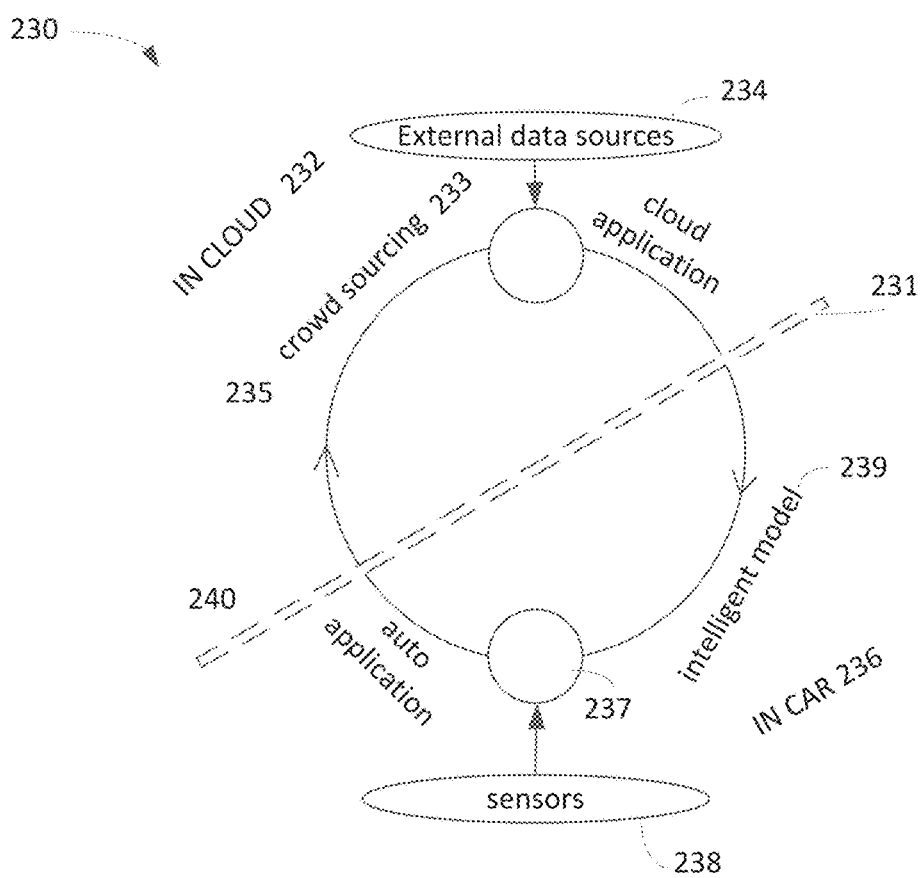

FIG. 2B is a block diagram 230 illustrating an alternative exemplary virtuous cycle capable of detecting DR in accordance with one embodiment of the present invention. Diagram 230 includes external data source 234, sensors 238, crowdsourcing 233, and intelligent model 239. In one aspect, components/activities above dotted line 231 are operated in cloud 232, also known as in-cloud component. Components/activities below dotted line 231 are operated in car 236, also known as in-device or in-car component. It should be noted that the underlying concept of the exemplary embodiment(s) of the present invention would not change if one or more blocks (or elements) were added to or removed from FIG. 2B.

In one aspect, in-cloud components and in-device components coordinate to perform desirable user specific tasks. While in-cloud component leverages massive scale to process incoming device information, cloud applications leverage crowd sourced data to produce applications. External data sources can be used to contextualize the applications to facilitate intellectual crowdsourcing. For example, in-car (or in-phone or in-device) portion of the virtuous cycle pushes intelligent data gathering to the edge application. In one example, edge applications can perform intelligent data gathering as well as intelligent in-car processing. It should be noted that the amount of data gathering may rely on sensor data as well as intelligent models which can be loaded to the edge.

Figure 3:
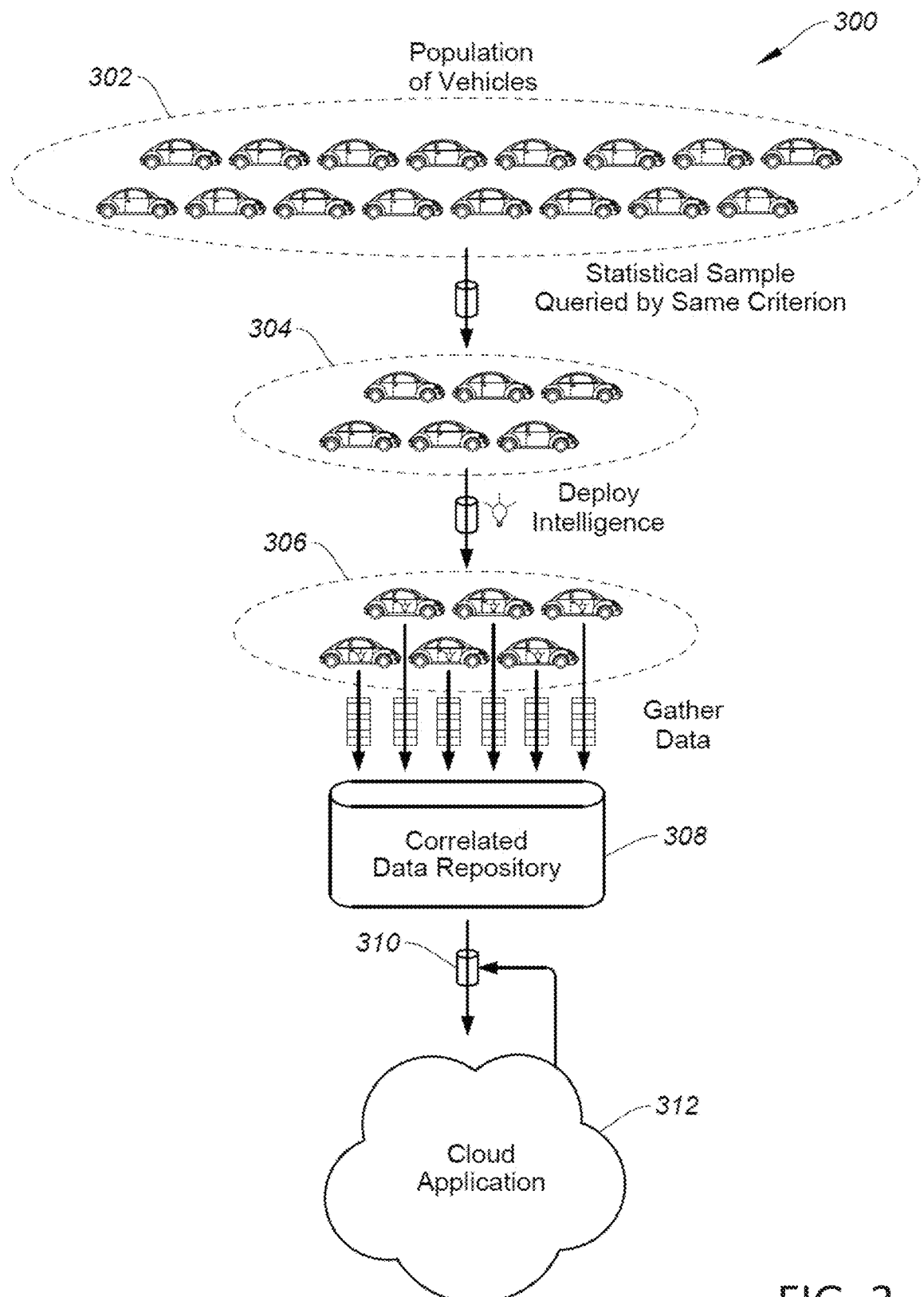
FIG. 3 is a block diagram illustrating a cloud based network using crowdsourcing approach to improve DR model(s) in accordance with one embodiment of the present invention.

FIG. 3 is a block diagram 300 illustrating a cloud based network using crowdsourcing approach to improve DR model(s) in accordance with one embodiment of the present invention. Diagram 300 includes population of vehicles 302, sample population 304, models deployment 306, correlation component 308, and cloud application 312. It should be noted that the underlying concept of the exemplary embodiment(s) of the present invention would not change if one or more blocks (or samples) were added to or removed from FIG. 3.

Crowdsourcing is a process of using various sourcing or specific models generated or contributed from other cloud or Internet users for achieving needed services. For example, crowdsourcing relies on the availability of a large population of vehicles, phones, or other devices to source data 302. For example, a subset of available devices such as sample 304 is chosen by some criterion such as location to perform data gathering tasks. To gather data more efficiently, intelligent models are deployed to a limited number of vehicles 306 for reducing the need of large uploading and processing a great deal of data in the cloud. It should be noted that the chosen devices such as cars 306 monitor the environment with the intelligent model and create succinct data about what has been observed. The data generated by the intelligent models is uploaded to the correlated data store as indicated by numeral 308. It should be noted that the uploading can be performed in real-time for certain information or at a later time for other types of information depending on the need as well as condition of network traffic.

Correlated component 308 includes correlated data storage capable of providing a mechanism for storing and querying uploaded data. Cloud applications 312, in one embodiment, leverage the correlated data to produce new intelligent models, create crowd sourced applications, and other types of analysis.

Figure 4:
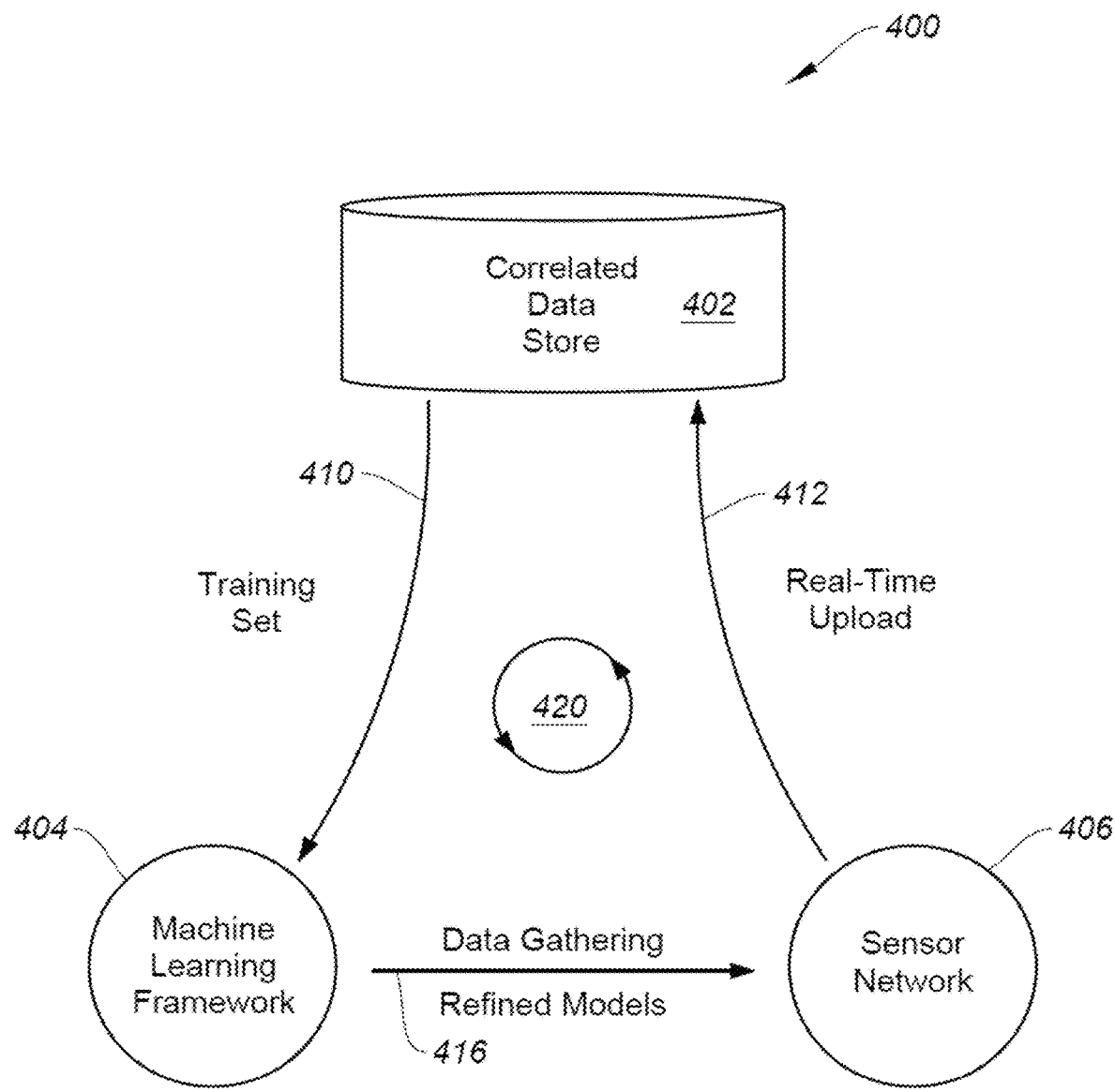
FIG. 4 is a block diagram illustrating a DR model or system using the virtuous cycle in accordance with one embodiment of the present invention.

FIG. 4 is a block diagram 400 illustrating a DRS using the virtuous cycle in accordance with one embodiment of the present invention. Diagram 400 includes a correlated data store 402, machine learning framework 404, and sensor network 406. Correlated data store 402, machine learning framework 404, and sensor network 406 are coupled by connections 410-416 to form a virtuous cycle as indicated by numeral 420. It should be noted that the underlying concept of the exemplary embodiment(s) of the present invention would not change if one or more blocks (circuit or elements) were added to or removed from FIG. 4.

In one embodiment, correlated data store 402 manages real-time streams of data in such a way that correlations between the data are preserved. Sensor network 406 represents the collection of vehicles, phones, stationary sensors, and other devices, and is capable of uploading real-time events into correlated data store 402 via a wireless communication network 412 in real-time or in a batched format. In one aspect, stationary sensors includes, but not limited to, municipal cameras, webcams in offices and buildings, parking lot cameras, security cameras, and traffic cams capable of collecting real-time images.

The stationary cameras such as municipal cameras and webcams in offices are usually configured to point to streets, buildings, parking lots wherein the images captured by such stationary cameras can be used for accurate labeling. To fuse between motion images captured by vehicles and still images captured by stationary cameras can track object(s) such as car(s) more accurately. Combining or fusing stationary sensors and vehicle sensors can provide both labeling data and historical stationary sampling data also known as stationary "fabric". It should be noted that during the crowdsourcing applications, fusing stationary data (e.g. stationary cameras can collect vehicle speed and position) with real-time moving images can improve ML process.

Machine Learning ("ML") framework 404 manages sensor network 406 and provides mechanisms for analysis and training of ML models. ML framework 404 draws data from correlated data store 402 via a communication network 410 for the purpose of training modes and/or labeled data analysis. ML framework 404 can deploy data gathering modules to gather specific data as well as deploy ML models based on the previously gathered data. The data upload, training, and model deployment cycle can be continuous to enable continuous improvement of models.

Figure 5:
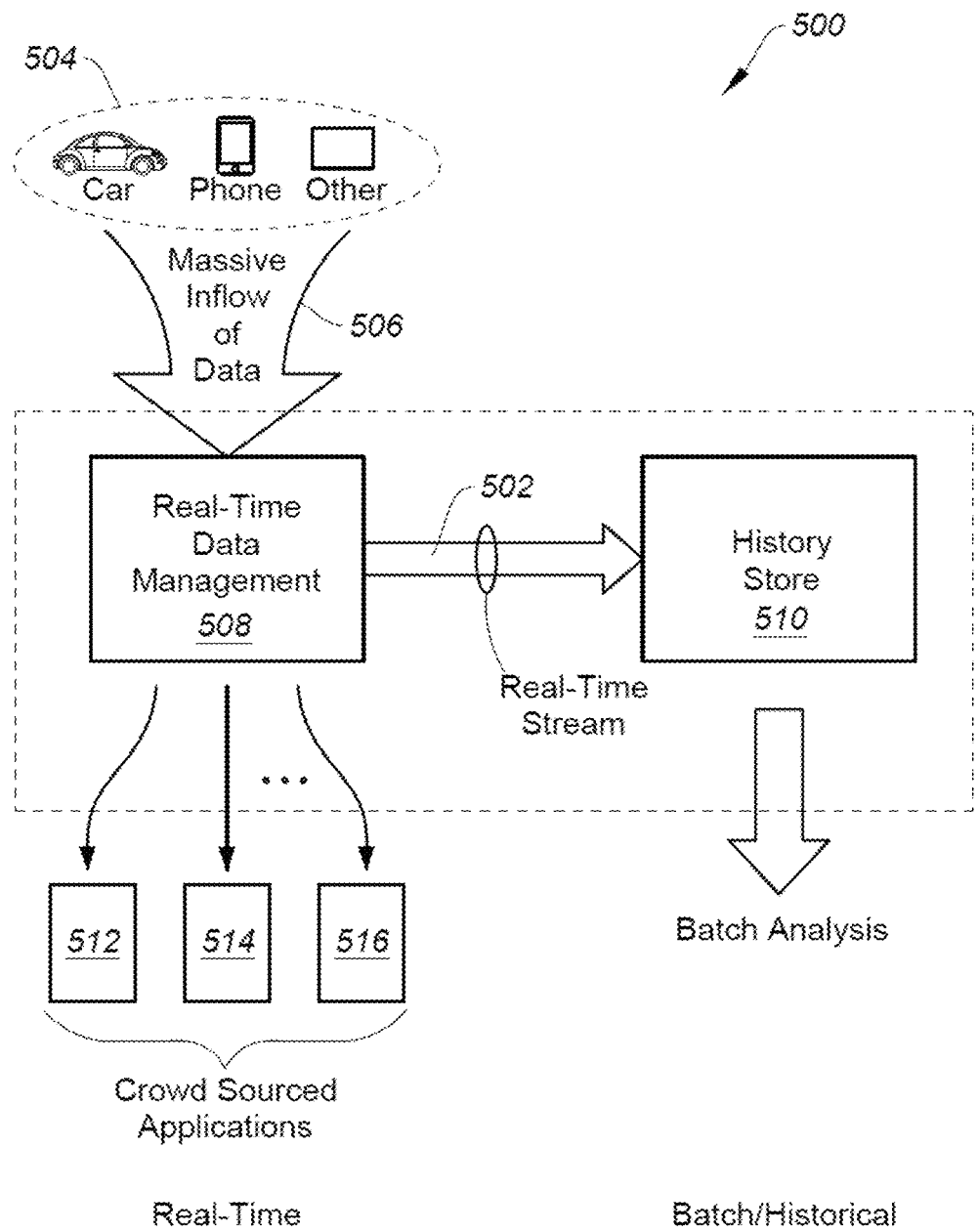
FIG. 5 is a block diagram illustrating an exemplary process of correlating DR data in accordance with one embodiment of the present invention.

FIG. 5 is a block diagram 500 illustrating an exemplary process of correlating DR data in accordance with one embodiment of the present invention. Diagram 500 includes source input 504, real-time data management 508, history store 510, and crowd sourced applications 512-516. In one example, source input 504 includes cars, phones, tablets, watches, computers, and the like capable of collecting massive amount of data or images which will be passed onto real-time data management 508 as indicated by numeral 506. It should be noted that the underlying concept of the exemplary embodiment(s) of the present invention would not change if one or more blocks (or elements) were added to or removed from FIG. 5.

In one aspect, a correlated system includes a real-time portion and a batch/historical portion. The real-time part aims to leverage new data in near or approximately real-time. Real-time component or management 508 is configured to manage a massive amount of influx data 506 coming from cars, phones, and other devices 504. In one aspect, after ingesting data in real-time, real-time data management 508 transmits processed data in bulk to the batch/historical store 510 as well as routes the data to crowd sourced applications 512-516 in real-time.

Crowd sourced applications 512-516, in one embodiment, leverage real-time events to track, analyze, and store information that can be offered to user, clients, and/or subscribers. Batch-Historical side of correlated data store 510 maintains a historical record of potentially all events consumed by the real-time framework. In one example, historical data can be gathered from the real-time stream and it can be stored in a history store 510 that provides high performance, low cost, and durable storage. In one aspect, real-time data management 508 and history store 510 coupled by a connection 502 are configured to perform DR data correlation as indicated by dotted line.

Figure 6:
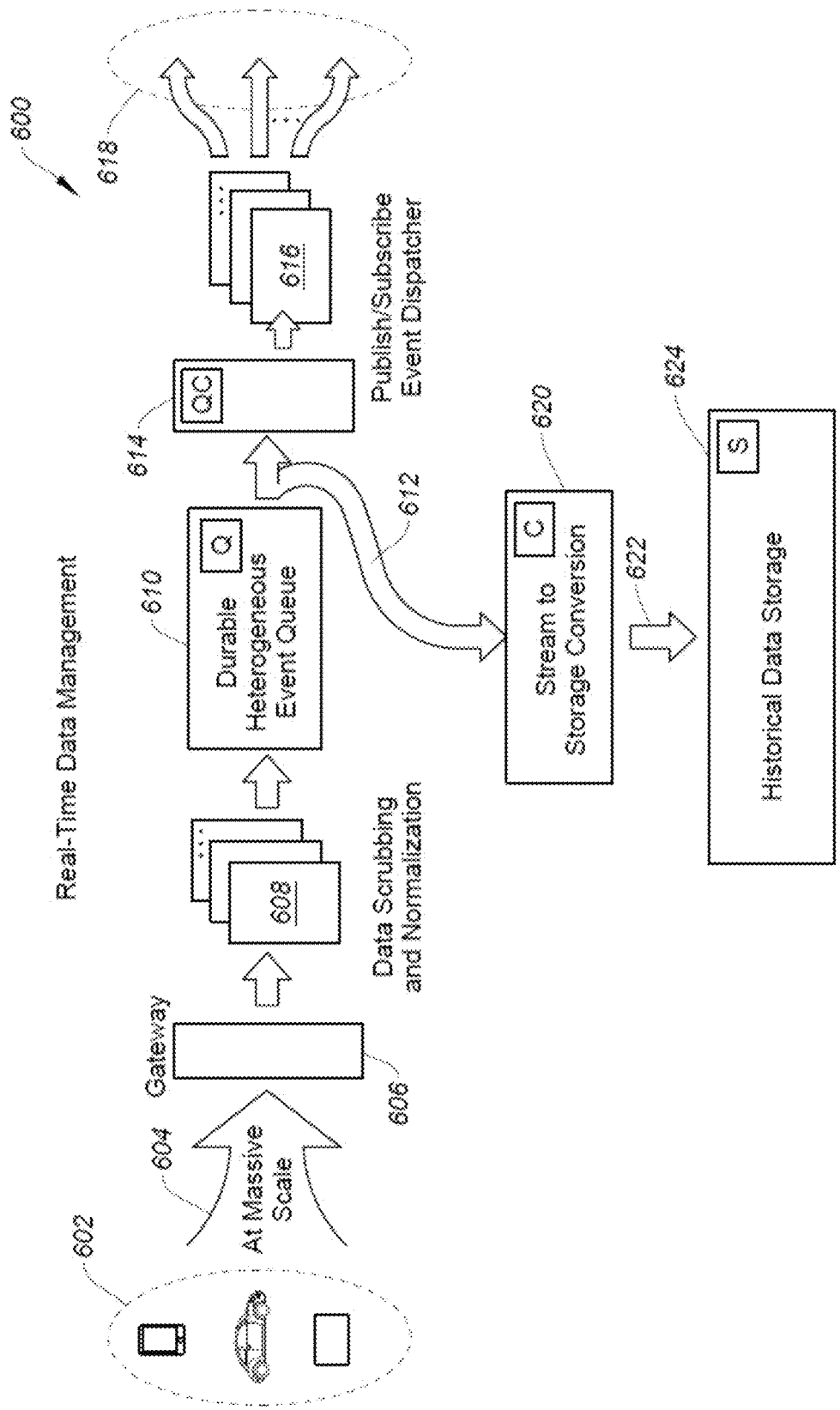
FIG. 6 is a block diagram illustrating an exemplary process of real-time data management for DR model in accordance with one embodiment of the present invention.

FIG. 6 is a block diagram 600 illustrating an exemplary process of real-time data for DRS in accordance with one embodiment of the present invention. Diagram 600 includes data input 602, gateway 606, normalizer 608, queue 610, dispatcher 616, storage conversion 620, and historical data storage 624. The process of real-time data management further includes a component 614 for publish and subscribe. It should be noted that the underlying concept of the exemplary embodiment(s) of the present invention would not change if one or more blocks (circuit or elements) were added to or removed from FIG. 6.

The real-time data management, in one embodiment, is able to handle a large numbers (i.e., 10's of millions) of report events to the cloud as indicated by numeral 604. API (application program interface) gateway 606 can handle multiple functions such as client authentication and load balancing of events pushed into the cloud. The real-time data management can leverage standard HTTP protocols. The events are routed to stateless servers for performing data scrubbing and normalization as indicated by numeral 608. The events from multiple sources 602 are aggregated together into a scalable/durable/consistent queue as indicated by numeral 610. An event dispatcher 616 provides a publish/subscribe model for crowd source applications 618 which enables each application to look at a small subset of the event types. The heterogeneous event stream, for example, is captured and converted to files for long-term storage as indicated by numeral 620. Long-term storage 624 provides a scalable and durable repository for historical data.

Figure 7:
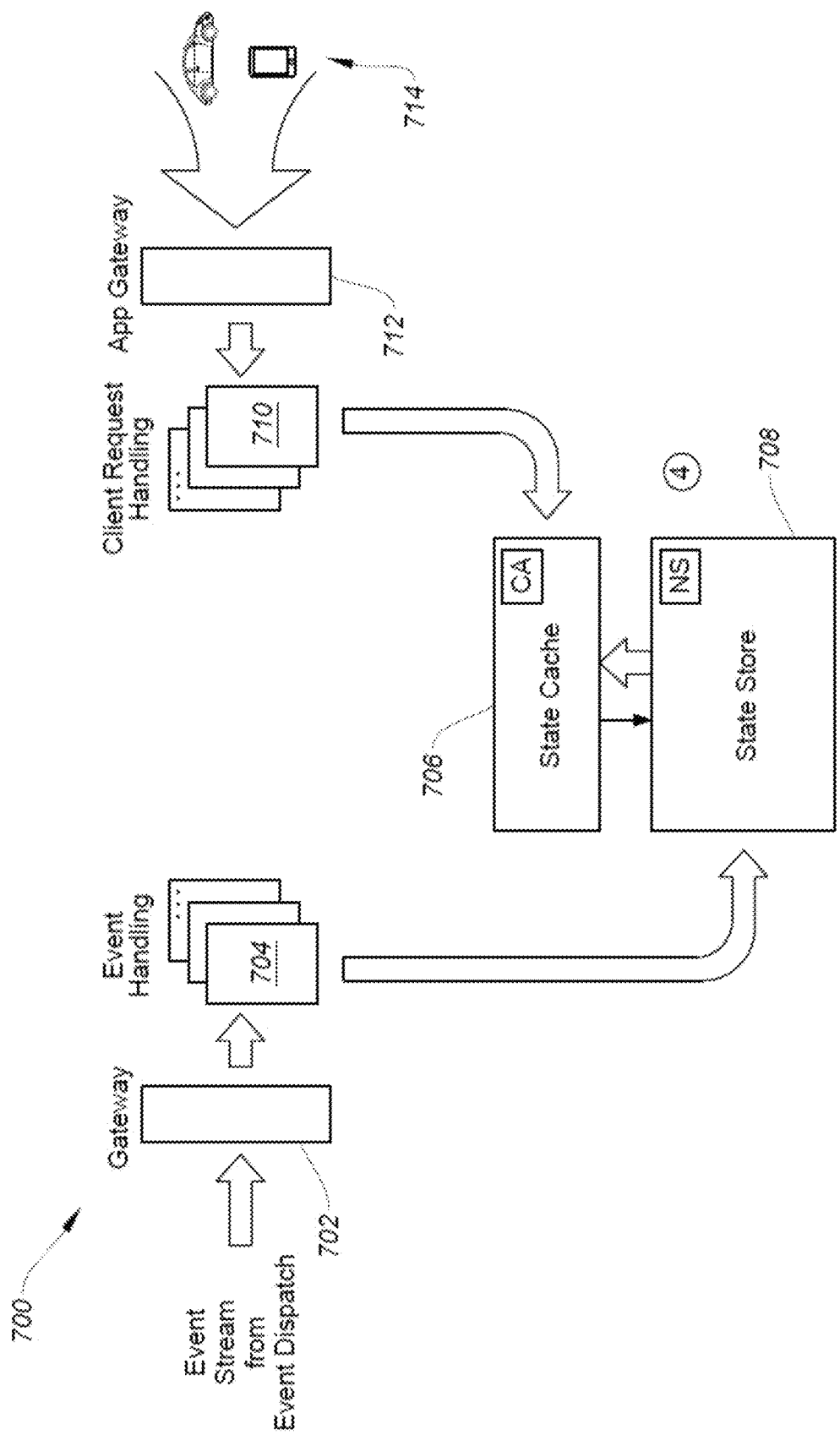
FIG. 7 is a block diagram illustrating a crowd sourced application model for DR model in accordance with one embodiment of the present invention.

FIG. 7 is a block diagram 700 illustrating a crowd sourced application model for DR model in accordance with one embodiment of the present invention. Diagram 700 includes a gateway 702, event handler 704, state cache 706, state store 708, client request handler 710, gateway 712, and source input 714. In one example, gateway 702 receives an event stream from an event dispatcher and API gateway 712 receives information/data from input source 714. It should be noted that the underlying concept of the exemplary embodiment(s) of the present invention would not change if one or more blocks (or elements) were added to or removed from FIG. 7.

The crowd sourced application model, in one embodiment, facilitates events to be routed to a crowd source application from a real-time data manager. In one example, the events enter gateway 702 using a simple push call. Note that multiple events are handled by one or more servers. The events, in one aspect, are converted into inserts or modifications to a common state store. State store 708 is able to hold data from multiple applications and is scalable and durable. For example, State store 708, besides historical data, is configured to store present data, information about "future data", and/or data that can be shared across applications such as predictive AI (artificial intelligence).

State cache 706, in one example, is used to provide fast access to commonly requested data stored in state store 708. Note that application can be used by clients. API gateway 712 provides authentication and load balancing. Client request handler 710 leverages state store 708 for providing client data.

In an exemplary embodiment, an onboard DR model is able to handle real-time DR detection based on triggering events. For example, after ML models or DR models for DR detection have been deployed to all or most of the vehicles, the deployed ML models will report to collected data indicating DRS for facilitating issuance of real-time warning for dangerous event(s). The information or data relating to the real-time dangerous event(s) or DRS is stored in state store 708. Vehicles 714 looking for DR detection can, for example, access the DRS using gateway 712.

Figure 8:
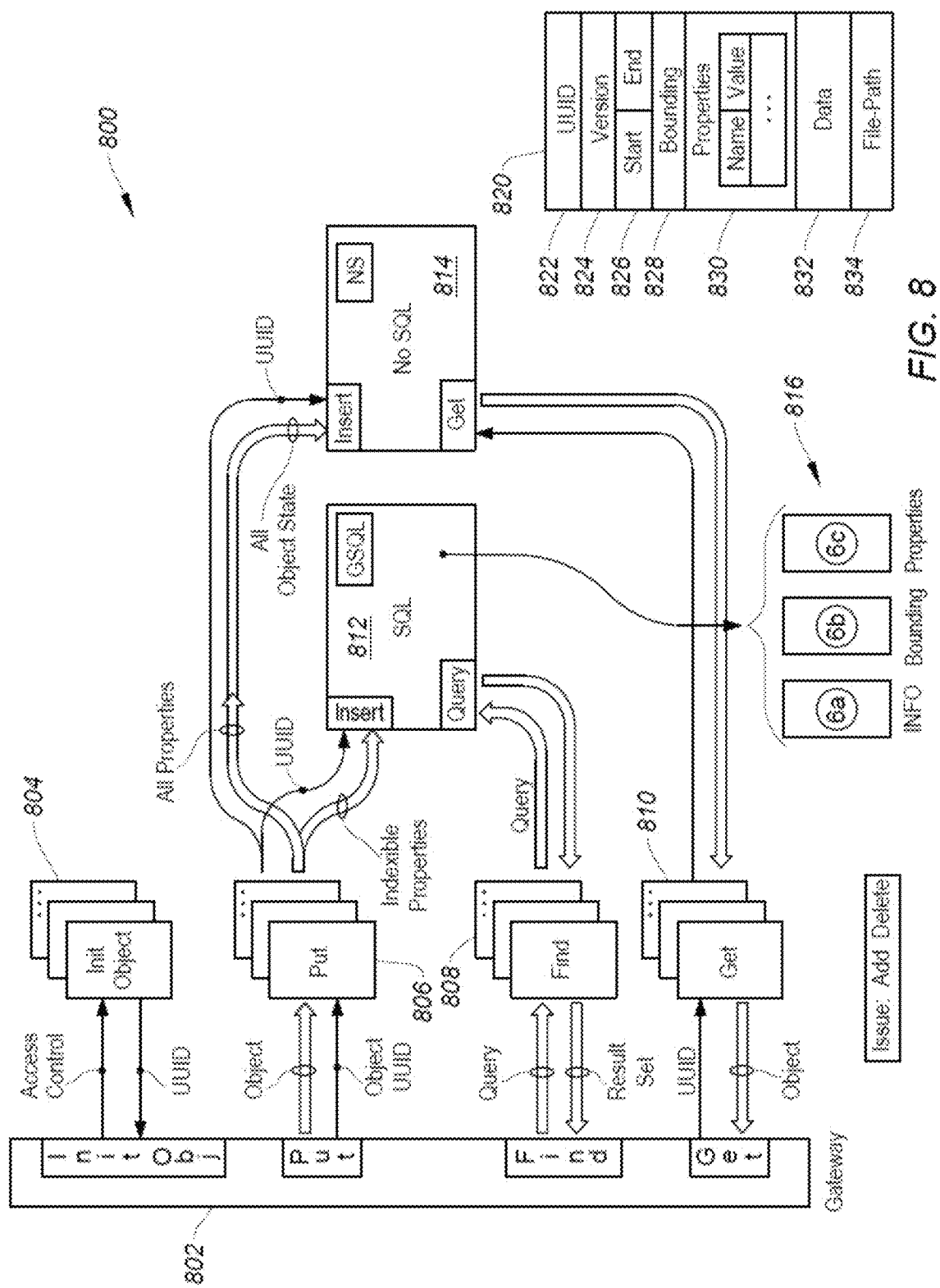
FIG. 8 is a block diagram illustrating a method of storing DR related data using a geo-spatial objective storage in accordance with one embodiment of the present invention.

FIG. 8 is a block diagram 800 illustrating a method of storing DR related data using a geo-spatial objective storage in accordance with one embodiment of the present invention. Diagram 800 includes gateway 802, initial object 804, put call 806, find call 808, get call 810, SQL (Structured Query Language) 812, non-SQL 814, and geo-spatial object storage 820. It should be noted that the underlying concept of the exemplary embodiment(s) of the present invention would not change if one or more blocks (circuit or elements) were added to or removed from FIG. 8.

Geo-spatial object storage 820, in one aspect, stores or holds objects which may include time period, spatial extent, ancillary information, and optional linked file. In one embodiment, geo-spatial object storage 820 includes UUID (universally unique identifier) 822, version 824, start and end time 826, bounding 828, properties 830, data 832, and file-path 834. For example, while UUID 822 identifies an object, all objects have version(s) 824 that allow schema to change in the future. Start and end time 826 indicates an optional time period with a start time and an end time. An optional bounding geometry 828 is used to specify spatial extent of an object. An optional set of properties 830 is used to specify name-value pairs. Data 832 can be binary data. An optional file path 834 may be used to associate with the object of a file containing relevant information such as MPEG (Moving Picture Experts Group) stream.

In one embodiment, API gateway 802 is used to provide access to the service. Before an object can be added to the store, the object is assigned an UUID which is provided by the initial object call. Once UUID is established for a new object, the put call 804 stores the object state. The state is stored durably in Non-SQL store 814 along with UUID. A portion of UUID is used as hash partition for scale-out. The indexible properties includes version, time duration, bounding, and properties which are inserted in a scalable SQL store 812 for indexing. The Non-SQL store 814 is used to contain the full object state. Non-SQL store 814 is scaled-out using UUID as, for example, a partition key.

SQL store 812 is used to create index tables that can be used to perform queries. SQL store 812 may include three tables 816 containing information, bounding, and properties. For example, information holds a primary key, objects void, creation timestamp, state of object and object properties "version" and "time duration." Bounding holds the bounding geometry from the object and the id of the associated information table entry. Properties hold property name/value pairs from the object stored as one name/value pair per row along with ID of associated info table entry.

Find call 808, in one embodiment, accepts a query and returns a result set, and issues a SQL query to SQL store 812 and returns a result set containing UUID that matches the query.

Figure 9:
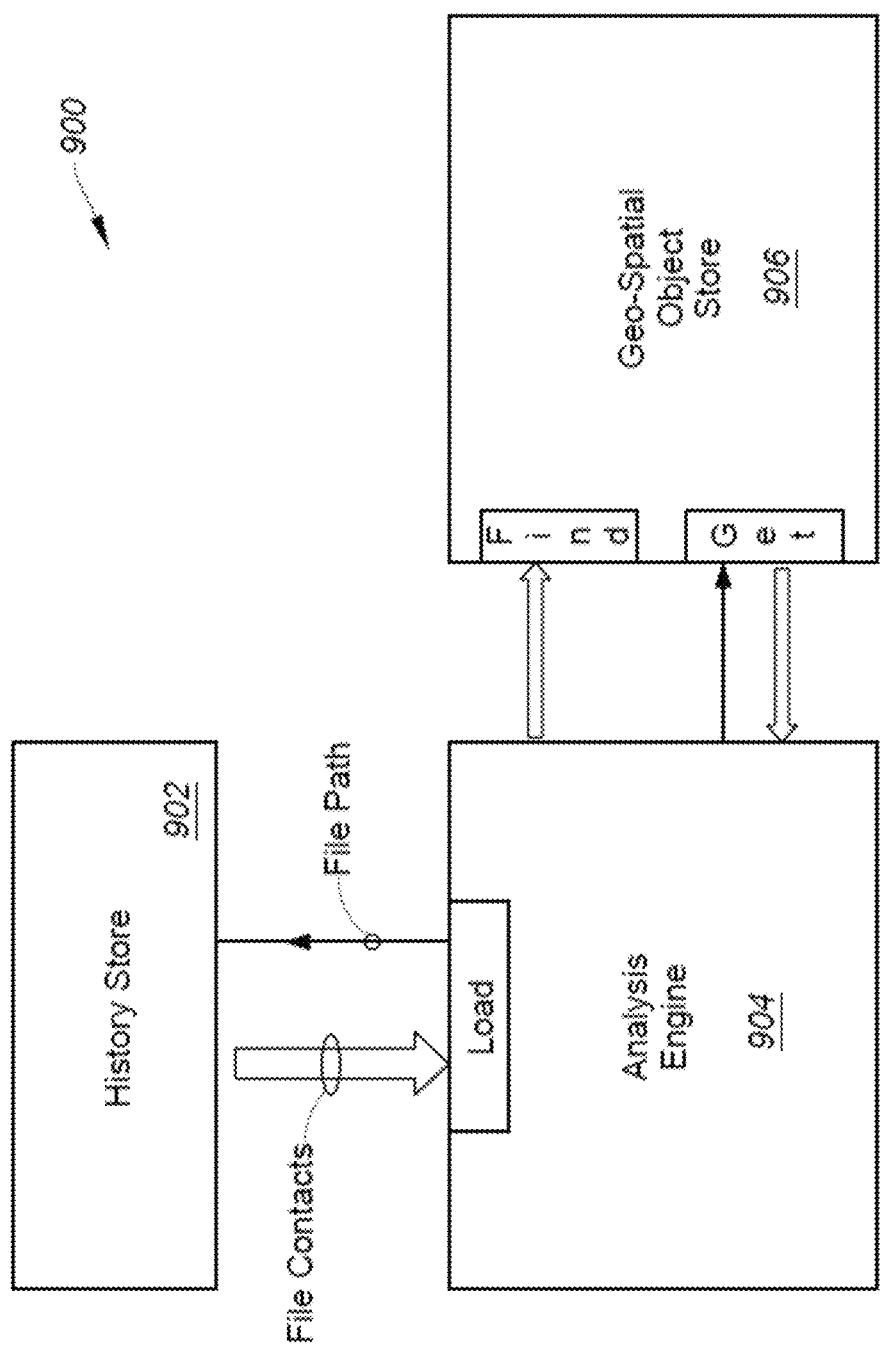
FIG. 9 is a block diagram illustrating an exemplary approach of analysis engine analyzing DR data in accordance with one embodiment of the present invention.

FIG. 9 is a block diagram 900 illustrating an exemplary approach of analysis engine analyzing DR data in accordance with one embodiment of the present invention. Diagram 900 includes history store 902, analysis engine 904, and geo-spatial object store 906. It should be noted that the underlying concept of the exemplary embodiment(s) of the present invention would not change if one or more blocks (circuit or elements) were added to or removed from FIG. 9.

In one aspect, diagram 900 illustrates analysis engine 904 containing ML training component capable of analyzing labeled data based on real-time captured DR data and historical data. The data transformation engine, in one example, interacts with Geo-spatial object store 906 to locate relevant data and with history store to process the data. Optimally, the transformed data may be stored.

It should be noted that virtuous cycle employing ML training component to provide continuous model training using real-time data as well as historical samples, and deliver DR detection model for one or more subscribers. A feature of virtuous cycle is able to continuous training a model and able to provide a real-time or near real-time result. It should be noted that the virtuous cycle is applicable to various other fields, such as, but not limited to, business intelligence, law enforcement, medical services, military applications, and the like.

Figure 10:
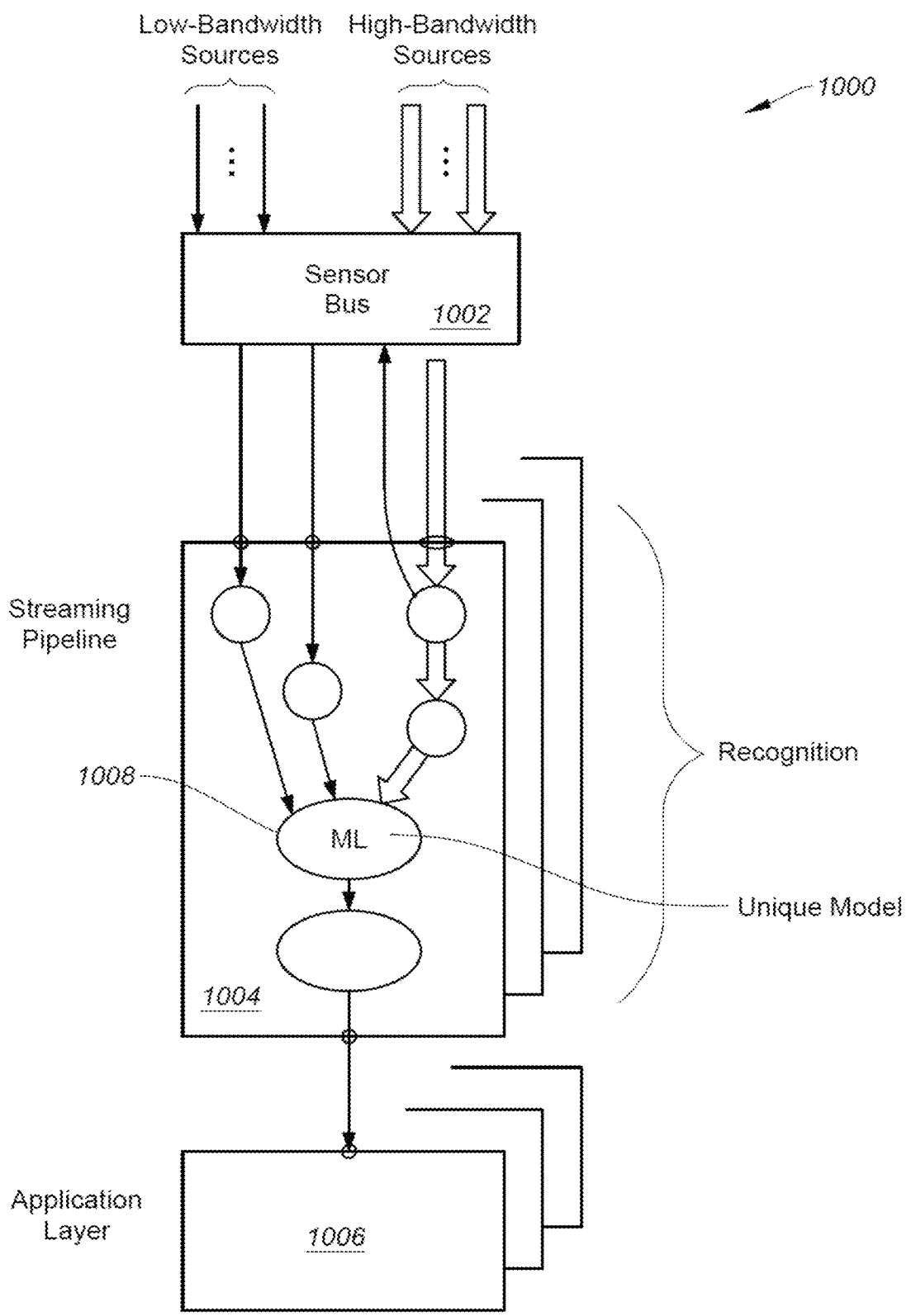
FIG. 10 is a block diagram illustrating an exemplary containerized sensor network used for sensing DR related information in accordance with one embodiment of the present invention.

FIG. 10 is a block diagram 1000 illustrating an exemplary containerized sensor network used for sensing DRS related information in accordance with one embodiment of the present invention. Diagram 1000 includes a sensor bus 1002, streaming pipeline 1004, and application layer 1006 wherein sensor bus 1002 is able to receive low-bandwidth sources and high-bandwidth sources. Streaming pipeline 1004, in one embodiment, includes ML capable of generating unique model such as model 1008. It should be noted that the underlying concept of the exemplary embodiment(s) of the present invention would not change if one or more blocks (circuit or elements) were added to or removed from FIG. 10.

Figure 11:
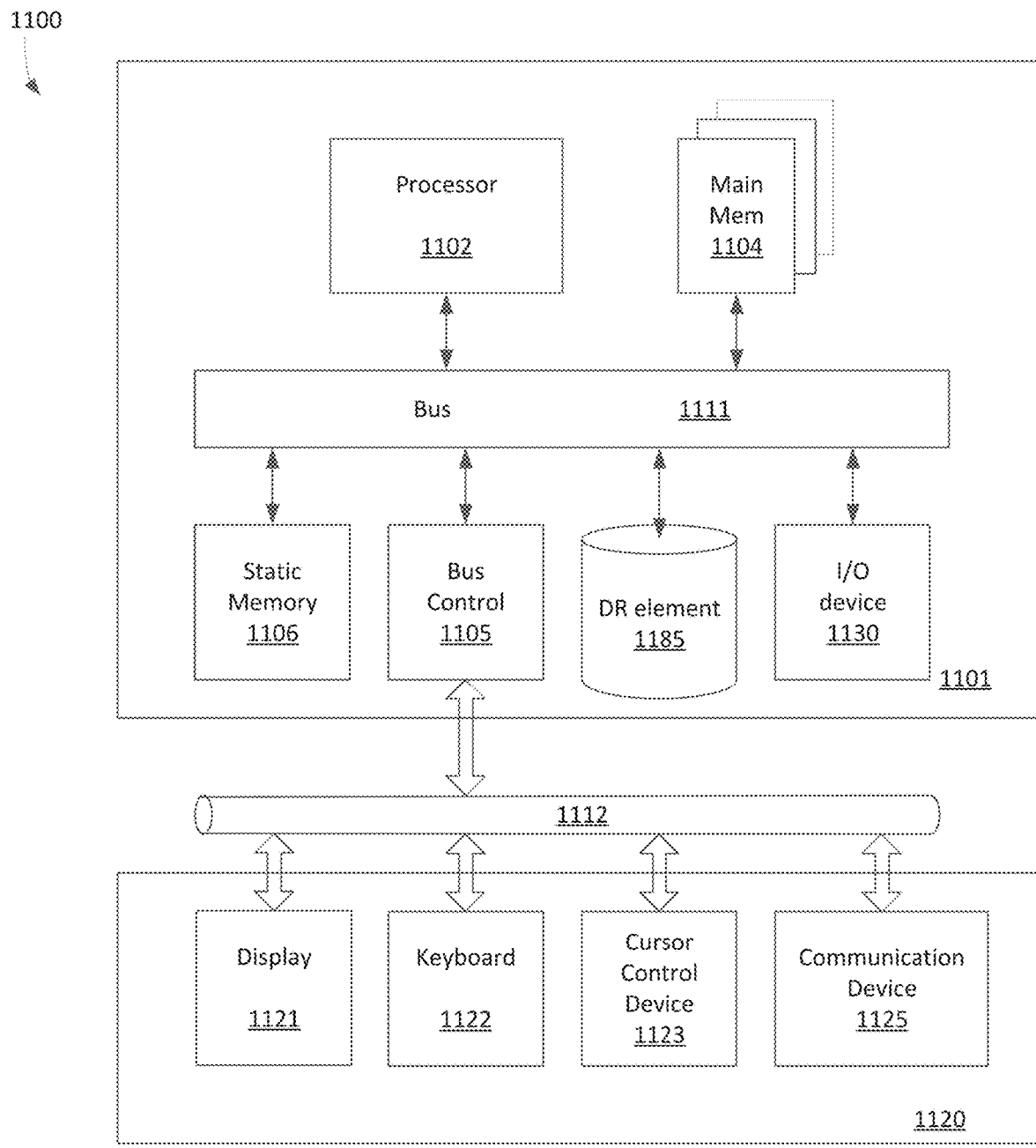
FIG. 11 is a block diagram illustrating a processing device or computer system which can be installed in a vehicle for facilitating the virtuous cycle in accordance with one embodiment of the present invention.

FIG. 11 is a block diagram 1100 illustrating a processing device or computer system which can be installed in a vehicle to support onboard cameras, CAN (Controller Area Network) bus, Inertial Measurement Units, Lidar, et cetera for facilitating virtuous cycle in accordance with one embodiment of the present invention. Computer system or DRS 1100 can include a processing unit 1101, an interface bus 1112, and an input/output ("IO") unit 1120. Processing unit 1101 includes a processor 1102, a main memory 1104, a system bus 1111, a static memory device 1106, a bus control unit 1105, I/O element 1130, and DRS element 1185. It should be noted that the underlying concept of the exemplary embodiment(s) of the present invention would not change if one or more blocks (circuit or elements) were added to or removed from FIG. 11.

Bus 1111 is used to transmit information between various components and processor 1102 for data processing. Processor 1102 may be any of a wide variety of general-purpose processors, embedded processors, or microprocessors such as ARM® embedded processors, Intel® Core™ Duo, Core™ Quad, Xeon®, Pentium™ microprocessor, Motorola™ 68040, AMD® family processors, or Power PC™ microprocessor.

Main memory 1104, which may include multiple levels of cache memories, stores frequently used data and instructions. Main memory 1104 may be RAM (random access memory), MRAM (magnetic RAM), or flash memory. Static memory 1106 may be a ROM (read-only memory), which is coupled to bus 1111, for storing static information and/or instructions. Bus control unit 1105 is coupled to buses 1111-1112 and controls which component, such as main memory 1104 or processor 1102, can use the bus. Bus control unit 1105 manages the communications between bus 1111 and bus 1112.

I/O unit 1120, in one embodiment, includes a display 1121, keyboard 1122, cursor control device 1123, and communication device 1125. Display device 1121 may be a liquid crystal device, cathode ray tube ("CRT"), touch-screen display, or other suitable display device. Display 1121 projects or displays images of a graphical planning board. Keyboard 1122 may be a conventional alphanumeric input device for communicating information between computer system 1100 and computer operator(s). Another type of user input device is cursor control device 1123, such as a conventional mouse, touch mouse, trackball, or other type of cursor for communicating information between system 1100 and user(s).

DR element 1185, in one embodiment, is coupled to bus 1111, and configured to interface with the virtuous cycle for facilitating DR performance. For example, if DRS 1100 is installed in a car, DR element 1185 is used to operate the DR model as well as interface with the cloud based network. If DRS 1100 is placed at the cloud based network, DR element 1185 can be configured to handle the correlating process for generating labeled data for DR.

Communication device 1125 is coupled to bus 1111 for accessing information from remote computers or servers, such as server 104 or other computers, through wide-area network 102. Communication device 1125 may include a modem or a network interface device, or other similar devices that facilitate communication between computer 1100 and the network. Computer system 1100 may be coupled to a number of servers via a network infrastructure such as the Internet.

The exemplary embodiment of the present invention includes various processing steps, which will be described below. The steps of the embodiment may be embodied in machine or computer executable instructions. The instructions can be used to cause a general purpose or special purpose system, which is programmed with the instructions, to perform the steps of the exemplary embodiment of the present invention. Alternatively, the steps of the exemplary embodiment of the present invention may be performed by specific hardware components that contain hard-wired logic for performing the steps, or by any combination of programmed computer components and custom hardware components.

Figure 12:
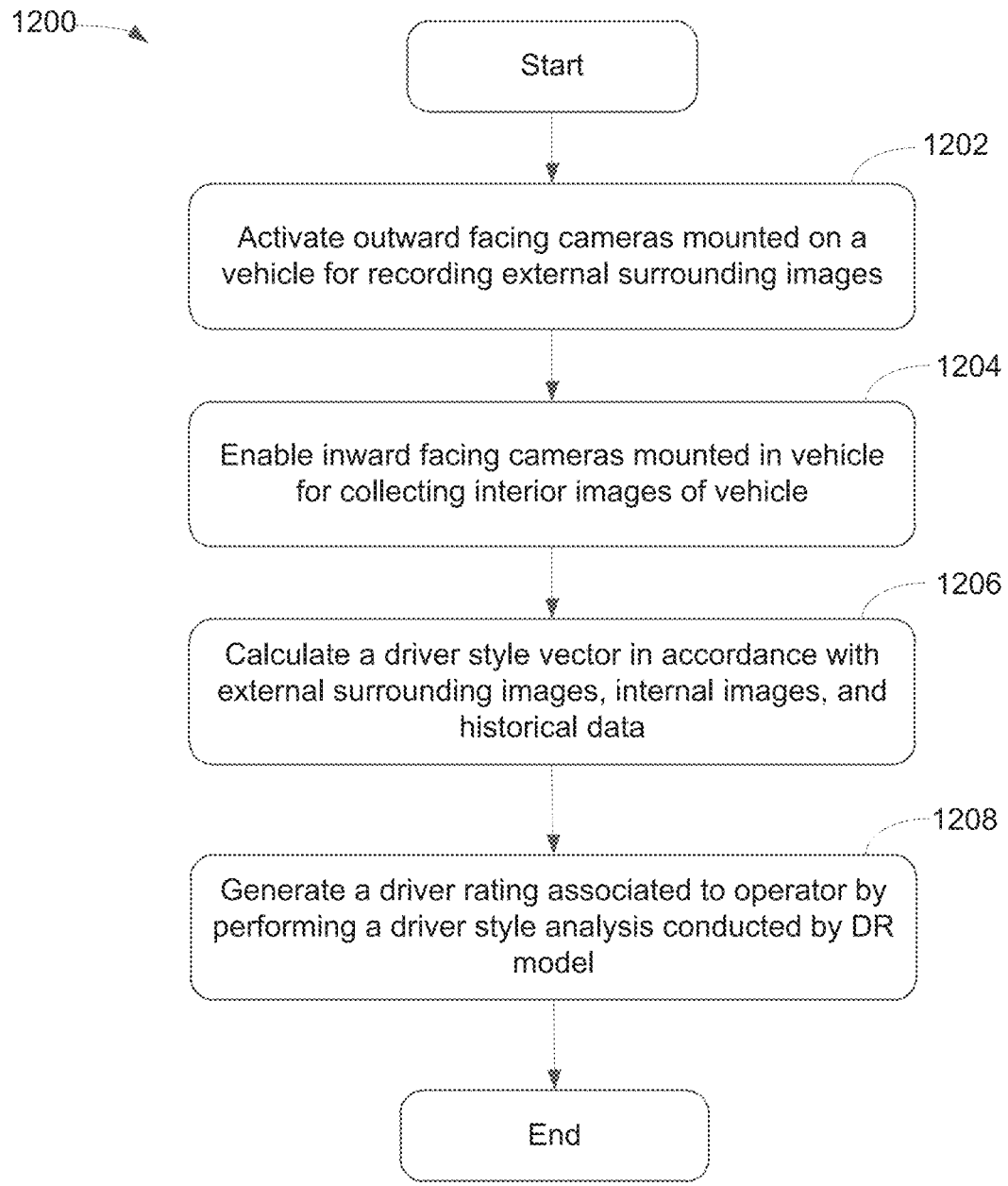
FIG. 12 is a flowchart illustrating a process of DR model or system capable of providing driver rating in accordance with one embodiment of the present invention.

FIG. 12 is a flowchart 1200 illustrating a process of DRS capable of assisting vehicle operation via metadata extraction processed by DR model in accordance with one embodiment of the present invention. At block 1202, a process of providing DR via metadata extraction is capable of activating a set of outward facing cameras mounted on a vehicle for recording external surrounding images representing a geographic environment in which the vehicle operates. At block 1204, the process is able to enable at least a portion of inward facing cameras mounted in the vehicle for collecting interior images of the vehicle. At block 1206, a driver style vector in accordance with external surrounding images, the internal images, and historical data is calculated. At block 1208, a driver rating associated to operator is generated via performance of a driver style analysis conducted by the DR model which is trained by the virtuous cycle. In one embodiment, the DR model is also capable of tracking surrounding environmental event in accordance with the external surrounding images and historical data supplied by the virtuous cycle. Alternatively, the process is also able to generate a process of adaptive advice and assistance by an adaptive driver assistant ("ADA") model in response to external surrounding images, the internal images, and historical data. In one example, the driver rating can be provided to a subscriber requesting the driver fingerprint.

While particular embodiments of the present invention have been shown and described, it will be obvious to those of ordinary skills in the art that based upon the teachings herein, changes and modifications may be made without departing from this exemplary embodiment(s) of the present invention and its broader aspects. Therefore, the appended claims are intended to encompass within their scope all such changes and modifications as are within the true spirit and scope of this exemplary embodiment(s) of the present invention.

What is claimed is:

1. A system for providing a current operating style of a driver of a vehicle, comprising:
a plurality of outward facing cameras mounted on the vehicle collecting external images representing a surrounding environment in which the vehicle operates;
a plurality of inward facing cameras mounted in the vehicle collecting internal images including operator body expression representing at least an attention of the driver; and
a vehicle onboard computer ("VOC"), coupled to the plurality of outward facing cameras and the plurality of inward facing cameras, configured to:
determine a plurality of current operator characteristics of the driver based on an analysis of the external images and the internal images;
calculate a feature vector for each of the plurality of current operator characteristics; and
determine the current operating style of the driver by plotting the feature vector of each of the plurality of current operator characteristics onto a multi-dimensional space, wherein different areas in the multi-dimensional space are associated with different operating styles.

2. The system of claim 1, wherein the VOC is further configured to:
determine a second plurality of current operator characteristics of the driver based on an analysis of the external images and the internal images,
calculate a second feature vector for each of the second plurality of current operator characteristics;
determine a second current operating style of the driver by plotting the second feature vector of each of the second plurality of current operator characteristics onto the multi-dimensional space; and
determine a change in driving style of the driver based on a delta distance between the current operating style and the second current operating style in the multi-dimensional space.

3. The system of claim 1, wherein the VOC determines the change in driving style by being configured to:
determine a direction of movement from the current operating style to the second current operating style in the multi-dimensional space, wherein the direction of movement is associated with a particular change in driving style.

4. The system of claim 1, wherein the plurality of outward facing cameras is configured to capture real-time images as the vehicle moves across a geographical area.

5. The system of claim 1, wherein the plurality of inward facing cameras is configured to extract metadata associated with at least one of operator head pose, gaze direction, and looking at a mobile device.

6. The system of claim 1, wherein the different operating styles include aggressive driving style, inattentive driving style, distracted driving style, and driving under influence.

7. The system of claim 1, further comprising a plurality of audio sensors configured to provide metadata relating to audio data to the VOC, wherein the VOC further determines the plurality of current operator characteristics based on the audio data.

8. The system of claim 7, wherein the plurality of audio sensors includes exterior audio sensors collecting exterior sound outside of the vehicle and interior audio sensors collecting interior sound inside of the vehicle.

9. The system of claim 1, wherein the collecting external images includes obtaining real-time images relating to at least one of road, buildings, traffic lights, pedestrian, and retailers.

10. The system of claim 1, wherein the collecting internal images includes a set of interior sensors obtaining data relating to at least one of the driver's eyes, the driver's facial expression, a passenger's vocal expressions, and a passenger's movement.

11. The system of claim 10, wherein the plurality of inward facing cameras includes at least one camera capable of detecting direction of where the driver is looking.

12. A method for providing driver rating of a driver of a vehicle, comprising:
- capturing, via one or more outward facing cameras mounted on the vehicle, external surrounding images representing a geographic environment in which the vehicle operates;
- capturing, via one or more inward facing cameras mounted in the vehicle, interior images of the vehicle;
- determining a plurality of current operator characteristics of the driver based on an analysis of the external surrounding images and the internal images;
- calculating a feature vector for each of the plurality of current operator characteristics;
- determining a current operating style of the driver by plotting the feature vector of each of the plurality of current operator characteristics onto a multi-dimensional space, wherein different areas in the multi-dimensional space are associated with different operating styles; and
- generating a driver rating for the driver based on the current operating style and a driver rating model trained front historical driving data of the driver.

13. The method of claim 12, further comprising tracking surrounding environmental event in accordance with the external surrounding images and the historical driving data.

14. The method of claim 12, further comprising generating adaptive advice and assistance for the driver in response to the current operating style.

15. The method of claim 12, further comprising providing the driver rating to a subscriber requesting driver style information.

* * * * *